US012758940B2

(12) United States Patent
Zhilkov

(10) Patent No.: US 12,758,940 B2
(45) Date of Patent: Oct. 13, 2026

(54) COMBINER OF ENERGY AND MATERIAL STREAMS FOR ENHANCED TRANSITION OF PROCESSED LOAD FROM ONE STATE TO ANOTHER

(71) Applicant: Accelbeam Inc., Cheyenne, WY (US)

(72) Inventor: Stanislav Zhilkov, Philadelphia, PA (US)

(73) Assignee: Accelbeam Inc., Cheyenne, WY (US)

( * ) Notice: Subject to any disclaimer, the term of this patent is extended or adjusted under 35 U.S.C. 154(b) by 769 days.

(21) Appl. No.: 17/480,765

(22) Filed: Sep. 21, 2021

(65) Prior Publication Data

US 2022/0088563 A1 Mar. 24, 2022

Related U.S. Application Data

(60) Provisional application No. 63/204,278, filed on Sep. 24, 2020.

(51) Int. Cl.
*B01J 19/12* (2006.01)
*B01J 19/00* (2006.01)
*B01J 19/02* (2006.01)

(52) U.S. Cl.
CPC ......... *B01J 19/126* (2013.01); *B01J 19/0066* (2013.01); *B01J 19/02* (2013.01)

(58) Field of Classification Search
CPC ...... B01J 19/126; B01J 19/0066; B01J 19/02; H05B 2206/044
USPC .................................................... 204/157.15
See application file for complete search history.

(56) References Cited

U.S. PATENT DOCUMENTS 2,676,257 A 4/1954 Hebenstreit
3,549,852 A 12/1970 Scott
3,557,333 A 1/1971 Mcavoy
3,619,536 A 11/1971 Boehm
(Continued)

FOREIGN PATENT DOCUMENTS

CN 104275124 A * 1/2015 ............ B01J 19/126
CN 107784067 A 3/2018
(Continued)

OTHER PUBLICATIONS

Stadler (Org. Proc. Res. Dev. 2003, 7, 5, 707-716) (Year: 2003).*
(Continued)

*Primary Examiner* — James Lin
*Assistant Examiner* — John Lee
(74) *Attorney, Agent, or Firm* — Oblon, McClelland, Maier & Neustadt, L.L.P.

(57) ABSTRACT

An apparatus for large batch chemical reactions using microwave energy includes a chamber defined by an outer wall, and a vessel disposed inside the chamber, the vessel defined by an inner wall, the inner wall being separated from the outer wall by a gap. The vessel is configured to receive and hold a load. The apparatus further includes a first applicator and a second applicator configured to emit the microwave energy at the load, wherein points at which microwave energy emitted by the first applicator and the second applicator enter the load are spaced at a distance from each other that is longer than a penetration depth of the microwave energy into the load such that no electromagnetic intercoupling occurs between the first applicator and the second applicator upon emission of the microwave energy.

17 Claims, 20 Drawing Sheets

(56) References Cited

U.S. PATENT DOCUMENTS

| | | | | |
|---|---|---|---|---|
| 3,691,338 | A | 9/1972 | Chang | |
| 3,953,702 | A | 4/1976 | Bickel | |
| 4,097,708 | A | 6/1978 | Bickel | |
| 4,108,759 | A | 8/1978 | Young | |
| 4,458,126 | A | 7/1984 | Dills et al. | |
| 4,460,814 | A | 7/1984 | Diesch et al. | |
| 4,508,946 | A | 4/1985 | Yoshimura et al. | |
| 4,596,915 | A | 6/1986 | Simpson | |
| 4,695,693 | A | 9/1987 | Staats et al. | |
| 4,795,871 | A | 1/1989 | Strattan et al. | |
| 4,898,118 | A | 2/1990 | Murakami et al. | |
| 5,186,181 | A | 2/1993 | Franconi et al. | |
| 5,446,426 | A | 8/1995 | Wu et al. | |
| 5,558,800 | A | 9/1996 | Page | |
| 5,672,316 | A | 9/1997 | Knapp | |
| 5,981,924 | A * | 11/1999 | Lautenschlager ...... B01J 19/126 | 219/685 |
| 6,555,011 | B1 | 4/2003 | Tribelsky et al. | |
| 6,783,628 | B2 | 8/2004 | Yamamoto et al. | |
| 7,119,314 | B2 | 10/2006 | Tandon et al. | |
| 7,210,424 | B2 | 5/2007 | Tolmachev et al. | |
| 7,227,097 | B2 | 6/2007 | Kumar et al. | |
| 7,227,109 | B2 | 6/2007 | Eke | |
| 7,547,864 | B2 | 6/2009 | Beausse | |
| 7,741,508 | B2 | 6/2010 | Sinha et al. | |
| 7,779,783 | B2 | 8/2010 | Ishibashi et al. | |
| 8,017,197 | B2 | 9/2011 | Kobayashi et al. | |
| 8,066,794 | B2 | 11/2011 | Liubakka et al. | |
| 8,128,788 | B2 | 3/2012 | Proudkii et al. | |
| RE43,332 | E | 5/2012 | Tribelsky et al. | |
| 8,207,479 | B2 | 6/2012 | Ben-Shmuel et al. | |
| 8,236,144 | B2 | 8/2012 | Proudkii et al. | |
| 8,487,223 | B2 | 7/2013 | Kimrey, Jr. | |
| 9,370,762 | B2 | 6/2016 | Ishizuka et al. | |
| 9,560,699 | B2 | 1/2017 | Zhylkov et al. | |
| 9,617,486 | B2 | 4/2017 | Kyle | |
| 9,656,234 | B2 | 5/2017 | Zhao et al. | |
| 9,833,764 | B2 | 12/2017 | Ishizuka et al. | |
| 10,269,541 | B2 | 4/2019 | Stowell et al. | |
| 10,271,876 | B2 | 4/2019 | Feskov et al. | |
| 10,464,040 | B2 | 11/2019 | Ishizuka et al. | |
| 2003/0089707 | A1 | 5/2003 | Fagrell et al. | |
| 2004/0094541 | A1 | 5/2004 | Lee et al. | |
| 2005/0027088 | A1* | 2/2005 | Nakahara ................ C08F 14/06 | 526/344 |
| 2005/0253529 | A1* | 11/2005 | Kumar ..................... H05H 1/46 | 315/111.71 |
| 2005/0258171 | A1 | 11/2005 | Witt | |
| 2006/0191926 | A1 | 8/2006 | Ray et al. | |
| 2007/0295717 | A1 | 12/2007 | Horikawa et al. | |
| 2008/0190916 | A1 | 8/2008 | Beausse | |
| 2008/0233020 | A1* | 9/2008 | Purta ...................... B01J 8/0257 | 422/186 |
| 2009/0178914 | A1 | 7/2009 | Longo et al. | |
| 2009/0179028 | A1 | 7/2009 | Purta et al. | |
| 2009/0218211 | A1 | 9/2009 | Yang et al. | |
| 2010/0126987 | A1 | 5/2010 | Zhylkov et al. | |
| 2010/0155392 | A1 | 6/2010 | Nordh et al. | |
| 2010/0176121 | A1 | 7/2010 | Nobue et al. | |
| 2011/0136923 | A1 | 6/2011 | Cha | |
| 2011/0189056 | A1 | 8/2011 | Brownell et al. | |
| 2011/0198207 | A1 | 8/2011 | Johnson | |
| 2012/0048721 | A1 | 3/2012 | Koji et al. | |
| 2012/0125920 | A1 | 5/2012 | Novak | |
| 2012/0305808 | A1 | 12/2012 | Zhylkov et al. | |
| 2013/0062193 | A1* | 3/2013 | Proudkii ................ B01J 19/126 | 422/186.01 |
| 2015/0004069 | A1 | 1/2015 | Ishizuka et al. | |
| 2015/0144480 | A1 | 5/2015 | Zhao et al. | |
| 2017/0118807 | A1 | 4/2017 | Zhylkov et al. | |
| 2019/0046946 | A1* | 2/2019 | Strohm .................. B01J 19/088 | |
| 2019/0118228 | A1 | 4/2019 | Netzhammer | |
| 2019/0329213 | A1* | 10/2019 | Tsukahara ................ C07H 1/00 | |

FOREIGN PATENT DOCUMENTS

| | | | | |
|---|---|---|---|---|
| CN | 107794067 | A | * | 3/2018 |
| CN | 110650796 | A | | 1/2020 |
| DE | 102011116340 | A1 | | 4/2013 |
| EP | 0680243 | A2 | * | 11/1995 |
| EP | 0765105 | A2 | * | 3/1997 |
| EP | 3 252 381 | B1 | | 8/2021 |
| JP | 2002-113350 | A | | 4/2002 |
| JP | 2005053941 | A | | 3/2005 |
| JP | 2007-84389 | | | 4/2007 |
| JP | 2008-302281 | A | | 12/2008 |
| JP | 2014015381 | A | | 1/2014 |
| JP | 2015-523195 | A | | 8/2015 |
| JP | 6311906 | B1 | | 4/2018 |
| TW | 268092 | B | | 1/1996 |
| TW | 201900275 | A | | 1/2019 |
| WO | WO 2003034790 | A2 | * | 7/2003 |
| WO | 2005/102510 | A1 | | 11/2005 |
| WO | WO2007053088 | A1 | | 5/2007 |
| WO | WO-2009048642 | A1 | * | 4/2009 |
| WO | WO-2010084333 | A1 | * | 7/2010 |
| WO | WO 2013/105358 | A1 | | 7/2013 |

OTHER PUBLICATIONS

Office Action issued Jul. 13, 2023, in corresponding Eurasian Patent Application No. 202390953 (with English Translation), 4 pages.
Office Action issued Oct. 25, 2023, in corresponding Eurasian Patent Application No. 202390953 (with English Translation), 2 pages.
Israel Office Action issued Aug. 1, 2023 in Israel Patent Application No. 301515, 5 pages.
International Search Report and Written Opinion Issued Dec. 23, 2021 in PCT/US21/51302, 13 pages.
Office Action dated Mar. 24, 2025 issued in Taiwanese application No. 110135252, with English translation.
Office Action dated May 14, 2025, issued in Japanese patent application No. 2023-518725, with computer-generated English translation.
Korean Office Action issued Oct. 24, 2025, in corresponding Korean Patent Application No. 10-2023-7013743, 18 pages.
UAE Office Action and Search Report issued Dec. 30, 2025 in corresponding UAE Patent Application No. P6000655/2023, 9 pages.
Japanese Office Action issued Dec. 9, 2026 in corresponding Japanese Patent Application No. 2023-518725, with English machine translation, 21 pages.
Taiwanese Office Action issued Apr. 21, 2026 in corresponding Taiwanese Patent Application No. 110135252, with English Translation. 3 pages.
Chinese Office Action and Search Report issued Apr. 11, 2026 in corresponding Chinese Patent Application No. 202180065448.X, with English Translation, 18 pages.
Japanese Office Action issued Mar. 30, 2026 in corresponding Japanese Patent Application No. JP 2023-518725, with English Translation, 5 pages.
Australian Office Action issued Jul. 16, 2026 in corresponding Australian Patent Application No. 2021347676 , 4 pages.
Indian Office Action issued Aug. 4, 2026 in corresponding Indian Patent Application No. 202317028215, 9 pages.

* cited by examiner

COMBINER OF ENERGY AND MATERIAL STREAMS FOR ENHANCED TRANSITION OF PROCESSED LOAD FROM ONE STATE TO ANOTHER

CROSS-REFERENCE TO RELATED APPLICATIONS

The present application claims priority to U.S. Provisional Application No. 63/204,278, filed Sep. 24, 2020, the entire contents of which is incorporated by reference herein in its entirety.

FIELD

The present disclosure relates to an apparatus for uniform microwave processing of large reactant loads at high power and pressure.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

The term "Microwave" (MW) may apply for frequencies from 300 MHz to 300 GHz, and there may be six MW bands applicable for industrial use according to the United States Federal Communications Commission (FCC), including two that are commonly exploited for heating of liquids in chemical processes in MW reactors: 915 MHz and 2.45 GHz (or more generally rounded to 2.5 GHz). Microwave processing of reactant loads at 2.5 GHz is generally uniform in related technologies when the loads are on the scale of 0.01-1 L; the related technologies also assume one or few microwave applicators in use. Larger reactant loads can result in increased non-uniformity of heating. It can be difficult to uniformly process a large reactant load by a single applicator or small number of applicators, and it can be difficult to simultaneously tune a large number of applicators in a multi-mode chamber because of inter-coupling between applicators.

Some related solutions to the above-described problems have considered the reactant load as a small portion of a reactant vessel (i.e., a chamber or a reactor) and tried to provide some solutions for approaching of microwave uniformity from several applicators in the whole chamber without considering a load as part of the solution. The implementation of microwaves into industrial-scale production can require processing of volumes>100 L; for example, such a requirement can be applied to a single-batch production in the pharmaceutical field. Notably, microwave-assisted heating under controlled conditions has been shown to be a valuable technology for any application that requires heating of a reaction mixture, since it often dramatically reduces reaction times—typically from days or hours to minutes or even seconds. Thus, uniform microwave processing of large-scale reactant loads is desired.

On a small scale, microwave-assisted organic synthesis (MAOS) of different active pharmaceutical ingredients (API), building blocks (BB) for drug manufacture, and drugs themselves has been demonstrated. For example, manufacturing of Acetaminophen, Azithromycin, Ciprofloxacin, Chloroquine phosphate, Hydroxychloroquine sulfate and similar medications can be partially substituted by MAOS with similar or better yield and relatively fast reaction time, compared to conventional heat-based manufacturing. By means of MAOS, not only substitutes for the five above-mentioned compounds may be synthesized, but additional compounds from the list of top 15 Tier 1 Priority Medicines for COVID-19 (see *Office of the Assistant Secretary for Administration* (*HHS, Health and Human Services*) *Info. HHS*-2020-*RFI-COVID*-19-2—*Priority ICU Medicines COVID*-19 *Response Sheet*. Apr. 5, 2020), but also many others including known and new compounds that demonstrate anti-cancer activity, anti-viral (for example Zovirax), anti-bacterial (for example Bactrim), anti-fungal, HIV protease inhibitors, and anti-Alzheimer agents. MAOS production of API for drugs applicable to treat a male-factor infertility related to erectile dysfunction were also reported. (2005. Khan et al. *A facile and improved synthesis of sildenafil* (*Viagra*) *analogs through solid support microwave irradiation possessing tyrosinase inhibitory potential their conformational analysis and molecular dynamics simulation studies. Mol Divers,* 2005 vol 9(1-5) p 15-26) and (2010. Richard Wagner. *Efficient use of microwave-assisted steps in synthesis of the Cialis-like generic*. Private communication to S. Zhilkav). In addition to API/BB/drugs above, the use of MAOS can be helpful in peptide production (see 2011. Ghosh. *Microwave assisted peptide synthesis.* 32-*slide presentation*, Dec. 8, 2011).

For example, the entire synthesis of Acetaminophen, from the initial hydrogenation of 4-nitrophenol to the final isolation of acetaminophen, was completed in under 90 minutes, a 70% time-savings when compared to conventional approach (see 2009, *CEM ap*0141, *Rapid, two-step microwave-assisted synthesis of acetaminophen*). However, such synthesis was performed using small, 10 mL glass tubes as the reaction vessel.

For example, also using 10 mL glass pressure microwave tubes, non-steroidal anti-inflammatory drug (NSAID) acetaminophen conjugates with amino acid linkers were synthesized utilizing benzotriazole chemistry (see 2014, Tiwari, et al. *Microwave assisted synthesis and QSAR study of novel NSAID acetaminophen conjugates with amino acid linkers. Org. Biomol. Chem.,* 2014, v12 p 7238-7249). Biological data acquired for all the bis-conjugates showed (a) some bis-conjugates exhibit more potent anti-inflammatory activity than their parent drugs, (b) the potent bis-conjugates show no visible stomach lesions in contrast to parent drugs which are highly ulcerogenic, and (c) the potent bio-active compounds have no mortality rates or toxic symptoms at 5-fold the applied anti-inflammatory dosage.

For example, performing MAOS in 10 mL vials again, the propacetamol hydrochloride compound was obtained in 98% isolated yield when the reaction mixture was heated in the microwave under 10 min at 120° C. (see 2016, Murie, et al. *Acetaminophen prodrug: microwave-assisted synthesis and in vitro metabolism evaluation by mass spectrometry. J. Braz. Chem. Soc.,* 2016). The developed MAOS protocol has also extra advantages such as an absence of catalyst, low solvent volume and short reaction time. Notably, conventional heating methods produce the same compound with 50% yield and 12 hours process time.

The use of microwave in organic synthesis has led to new acetamide derivatives (see 2020, Alsamarrai, Abdulmajeed S. H. and Abdulghani, Saba S. *Microwave-assisted synthesis, structural characterization of amino pyridines, pyrrolidine, piperidine, morpholine, acetamides, and assessment of their antibacterial activity*. Preprint, 31p. University of Samarra, Iraq. dot: 10.20944/preprints202010.0077.v1). Seven compounds were synthesized using MAOS in an attempt to increase yields and reduce the reaction time. Moderate to good yields and reduction of reaction time from 2-3 hours to a few minutes were achieved. The application against Gram-positive and Gram-negative bacterial species demonstrated encouraging antibacterial potency in comparison with used reference antibiotics.

Currently, around 450 APIs are used for drug production. Approximately for half of them, the use of microwave technology can improve the manufacturing process in such aspects as reducing process steps, shortening reaction time, increasing product yield, saving or even eliminating use of catalysts, simplifying process control, compacting space occupied by equipment, saving energy consumption, increasing productivity, and overall decreasing of production cost.

As discussed above, microwave processing shows promising potential for improving drug production if such microwave processing can be operational at production scale. The smaller scale investigations have demonstrated microwave energy can be applied to known chemical processes, which, if provided a suitable apparatus that overcomes the current large-scale production challenges, can lead to greater output of desired medicines and chemical products at potentially greater purity. Thus, an apparatus for large-scale chemical processes using microwave energy is desired.

Small-scale microwave reactors have been in research use for drug discovery and process optimization investigations. Small-scale reactors are bringing "proof of concept" experimental evidence of the potential benefits of MAOS for the pharmaceutical industry; such reactors operate with processing volumes of just 10 mL-1 L.

For example, exploring engineering principles, which constitute the small-scale reactors' technology base, generally achieves maximal processing volumes near 3 L with discrete placement of up to 40 small loaded tubes (e.g., 20 mL each) in a microwave reactor operating at a frequency of 2.45 GHz under conditions of high temperature (e.g., up to 260° C. for extended reaction times, or 300° C. for short reaction times) and high pressure (e.g., up to 200 bar/200 atm), but with a low microwave power of approximately (or less than) 1 kW (see UtraCLAVE). The volumes below or approximately 1 L are suitable for research and development for finding of new drug candidates' library or optimizing steps of desired processes, but such small volumes are insufficient for the manufacturing of drugs on an industrial scale, because of FDA requirements that typically necessitate a single batch's volume to be on the order of 100-1000 L for certification.

Linear scale-up of the MAOS-derived results from processing volumes of 1-10 mL to 12 L was recently demonstrated (see 2010. Schmink, et al. *Exploring the scope for scale-up of organic chemistry using a large batch microwave reactor. Organic Process Research & Devlpmnt*, Vol 14 No 1 p 205-214, 2010) using a reactor having max capacity of 12 L and operating conditions of high temperature (e.g., up to 220° C.) and pressure (e.g., up to 20-24 bar).

The reactor tested by Schmink, et al. exploits three microwave generators (each of 2.5 kW at 2.45 GHz) that irradiate into a pressurized (external) chamber, where an internal vessel (of volume 2 to 12 L) is placed and is loaded with substance(s) to be processed, wherein the volume of said chamber is significantly larger than the volume of said internal vessel. Technical solutions that have made the mentioned reactor possible are described in U.S. Pat. No. 9,560,699, US Patent Application No. 20170118807A1, US Patent Application No. 20120305808A1, US Patent Application No. 20110189056, and US Patent Application No. 20100126987. A related design is shown in FIG. 5B of US20120305808A1. The related design is a multi-mode chamber with a loaded vessel disposed inside the multi-mode chamber. Three patch antennas are arranged on the chamber's cupola or upper portion rather far from the vessel, and a shortest distance from any antenna to the vessel exceeds a free-space wavelength that is ~12 centimeters at a frequency of ~2.45 GHz. Between the vessel and the chamber's walls/cupola, there is sufficient space and a lack of obstacles for microwaves to freely propagate and to be reflected/refracted from one antenna to another. The antennas are tuned to be quasi-independent in the presence of a small load, such as 1 liter of water, and be mainly radiating waves towards said small load for heating; however, such tuning of antennas may become more difficult when a larger load is to be heated because of significant redirecting of waves from one antenna to another. The design of FIG. 5B of US20120305808A1 may not allow independent operation of generators (each antenna is supplied by a respective generator) and may not support independent control of the generators with respect to power transmission into the reactor's load. A design with six antennas may have the same limitations as explained above and be more difficult in supporting tuning and providing sufficient performance when a large load is used.

As such, when a load is a small part of the multi-mode chamber and fed (or energized) by multiple generators, and redirection of waves from one antenna to another is not prevented, then the batch design may have at most a 10-20 L achievable volume at 2.45 GHz frequency. In such a multi-mode design, without prevention of intercoupling of multiple antennas, the uniform microwave processing of a larger volume (over 20 L) is almost unachievable. This limit is confirmed by the fact that the largest commercially-available MAOS reactor has its maximal processing volume of 20 L and can operate at high temperatures around atmospheric pressure up to 1.5 bar (see 2020 *Labotron reactor:* 20 L, 6 kW con wavepower at 2.45 GHz. www-.SAIREM.com).

Industrial-scale use of microwave reactors in chemical fields unrelated to pharmaceuticals comprises such applications as food processing, biofuel manufacturing, producing of polymers and composites, sintering ceramics, synthesis of nanomaterials and plasma-chemical processing of variety of materials including semiconductors for optoelectronics and computer hardware. Food processing does not require any chemical substances—rather, only moderate heating is generally needed. Also, a high pressure is out of consideration. Thus, these simple process conditions are significantly different in comparison with complicated requirements desirable for pharmaceutical-oriented MAOS processing.

For transferring of microwaves into a volume, related approaches seek efficient transfer of the microwave energy with minimized influence of backward waves on a device that performs the energy transfer. Such devices can be called "antennas," "radiators," and "radiating apertures," among other terms. Antenna theory assumes consideration of waves rather far from the antenna with distances over at least ten times exceeding the wavelength of radiation. However, in typical microwave reactors their dimensions do not so largely exceed the aforementioned wavelengths. Said antenna devices are elucidated briefly herein.

An open end of a hollow waveguide or an open end of a coaxial transmission line are the simplest devices known for microwave energy transfer into a volume of interest. Being quite simple, they do not typically provide matching of a microwave generator with a load and are inefficient. More importantly, they do not prevent reflection of waves back to the generator. Two such simple open-ended antennas, operating simultaneously in one space, will experience influence of the waves' interference and will lead to inter-coupling of generators that initiate microwaves in said antennas. Said generators will harm each other, and microwave energy will not only be delivered to a load, but also significantly dissipates in intercoupling generators. Such operation does not allow arithmetic summation of generator powers, and control of energy delivery is problematic.

For example, in U.S. Pat. No. 4,460,814 having one generator, it was proposed to put the open-ended coaxial antenna directly into a large piece of meat for its processing, wherein said piece and said antenna are disposed inside a microwave oven. For example, U.S. Pat. No. 4,795,871 describes 2 to 6 open-ended hollow waveguides emitting from 2 to 6 generators through rectangular windows in walls of a microwave chamber into its cavity for processing of item inside said cavity, while the cross-polarization of presumably linearly polarized waves was expected to prevent intercoupling of generators. A dielectric window, dipole antenna, helical antenna, horn antenna, patch antenna, slotted-waveguide antenna, and other antenna types can be used in microwave ovens and reactors. Further, the proposed antennas can be made of various types of materials, including dielectric material, metal or a combination of thereof. Cross-polarization of simultaneously emitting antennas (of primarily linear polarization each) was assumed using up to six simultaneously-emitting antennas, and said cross-polarization was expected to prevent intercoupling of generators. Slightly different cross-polarized antennas can be named "microwave feeding points," as in US Patent Application No. US20030089707A1.

To avoid cross-talk between antennas, US Patent Application No. US20060191926A1 proposed to exploit a time separation between radiating by a first antenna and a second antenna. When the first antenna emits microwaves, the second one is out of operation, and vice versa. The time separation of each antenna's operation can resolve an intercoupling issue. However, said time separation does not allow simultaneously combining the high powers of multiple generators and, therefore, it has a significant disadvantage in view of a need to provide rapid heating of a large load as desirable for a scalable MAOS-based reactor. Thus, an apparatus for large-scale chemical processes using microwave energy while also eliminating intercoupling issues between antennas (or applicators) is desired.

Aspects of the disclosure may address some of the above-described shortcomings in the art, particularly with the solutions set forth in the claims.

SUMMARY

The present disclosure relates to methods and apparatuses for large-load MW processing. For processing a large load, the methods and apparatuses use a spatial separation for solving a problem of electromagnetic intercoupling and consider the load as part of the solution in providing sufficient spatial separation. It is proposed to use a plurality of microwave applicators, each of which occupies a separate subspace, and subspaces are not overlapping. Each applicator is coupled to a load independently from others. Absorption of microwaves in the load makes this load a part of the separating means when the load's size bigger than penetration depth of microwaves. Except for the applicator subspace's boundary aligned to the load, all other boundaries are non-transparent for microwaves without absorbing of microwave radiation of this applicator. Such space separation allows both exploitation of a number of applicators without their intercoupling and arithmetic summation of power of multiple microwave generators without interference. Therefore, the total delivered power can be high and can rapidly heat a load of large volume to a high temperature.

The present disclosure additionally relates to providing high pressure of MW processing. Another aspect of the invention is a use of the space separation for providing high-pressure processing. The load is placed inside a vessel, and the vessel is inside a pressure-compensating chamber. The vessel is pressurized, the chamber is pressurized, and differential pressure between vessel and chamber can be such that pressure inside the vessel can be significantly high for processing. A single batch can have a suitably large capacity to comply with pharmaceutical manufacturing requirements, when the described method is applied to the design of microwave reactors that can process substances of interest under conditions of high pressures and high temperatures.

The present disclosure additionally relates to an apparatus for large batch chemical reactions using microwave energy, including a chamber defined by an outer wall; a vessel disposed inside the chamber, the vessel defined by an inner wall, the inner wall being separated from the outer wall by a gap, the vessel configured to receive and hold a load; and a first applicator and a second applicator configured to emit the microwave energy at the load, wherein points at which microwave energy emitted by the first applicator and the second applicator enter the load are spaced at a distance from each other that is longer than a penetration depth of the microwave energy into the load such that no electromagnetic intercoupling occurs between the first applicator and the second applicator upon emission of the microwave energy.

The present disclosure additionally relates to a method for processing a material through application of microwave energy, the method including supplying a load comprising the material to a vessel disposed inside a chamber; and applying microwave energy to the load in the vessel through a first applicator and a second applicator configured to emit the microwave energy at the load, wherein points at which microwave energy emitted by the first applicator and the second applicator enter the load are spaced at a distance from each other that is longer than a penetration depth of the microwave energy into the load such that no electromagnetic intercoupling occurs between the first applicator and the second applicator upon emission of the microwave energy.

Note that this summary section does not specify every feature and/or incrementally novel aspect of the present disclosure or claimed invention. Instead, this summary only provides a preliminary discussion of different embodiments and corresponding points of novelty. For additional details and/or possible perspectives of the embodiments, the reader is directed to the Detailed Description section and corresponding figures of the present disclosure as further discussed below.

BRIEF DESCRIPTION OF THE DRAWINGS

Various embodiments of this disclosure that are proposed as examples will be described in detail with reference to the following figures, wherein.

DETAILED DESCRIPTION

Figure 1:
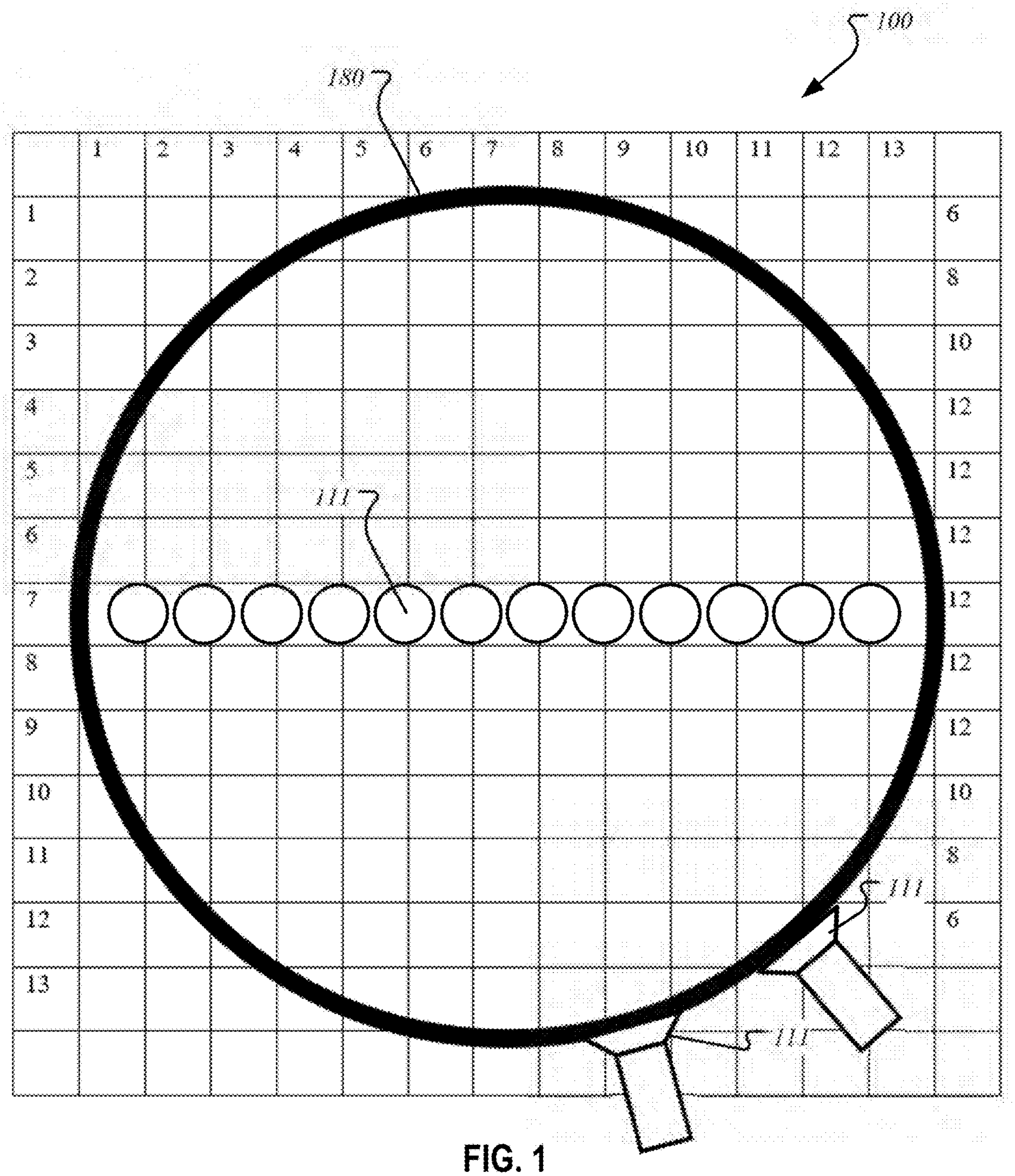
FIG. 1 is a projection of the bottom of the vessel with a geometrical grid of squares, according to an embodiment of the present disclosure.

The following disclosure provides many different variations, or examples, for implementing different features of the provided subject matter. Specific examples of components and arrangements are described below to illustrate the present disclosure. These are, of course, merely examples and are not intended to be limiting nor inoperable together in any permutation. Unless indicated otherwise, the features and embodiments described herein are operable together in any permutation. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as “top,” “bottom,” “beneath,” “below,” “lower,” “above,” “upper” and the like, may be used herein for ease of description to describe one element or feature’s relationship to another element(s) or feature(s) as illustrated in the figures. The spatially relative terms are intended to encompass different orientations of the device in use or operation in addition to the orientation depicted in the figures. Inventive apparatuses may be otherwise oriented (rotated 90 degrees or at other orientations) and the spatially relative descriptors used herein may likewise be interpreted accordingly.

The order of discussion of the different steps as described herein has been presented for clarity. In general, these steps can be performed in any suitable order. Additionally, although each of the different features, techniques, configurations, etc. herein may be discussed in different places of this disclosure, it is intended that each of the concepts can be executed independently of each other or in combination with each other. Accordingly, the present disclosure can be embodied and viewed in many different ways.

As previously described, the time separation of multiple antennas’ operation can resolve an intercoupling issue. However, said time separation may not allow simultaneous combination of the high power of multiple generators and, therefore, may have a significant disadvantage in view of a need to provide rapid heating of a large load as desirable for a scalable microwave-assisted organic synthesis (MAOS)-based reactor. Thus, described herein is an apparatus including a space separation for solving the problem of intercoupling that further considers the large load as part of the solution for providing the space separation.

In an embodiment, an apparatus 100 may include a chamber, a vessel disposed inside the chamber, and more than one microwave applicators 111 (herein referred to as “applicator 111”, see FIG. 1), each applicator 111 occupying a separate subspace of the apparatus 100, wherein the subspaces do not overlap. That is, the vessel may be defined by an inner wall 180 (see FIG. 1 showing a cross-sectional projection of the inner wall 180 over a grid, the outer wall forming the chamber that surrounds the inner wall 180 not shown) that separates an inner part of the apparatus (the vessel) from an outer part surrounding the vessel (the chamber) defined by an outer wall. A gap between the inner wall and the outer wall may define a portion of the subspace. The vessel and the chamber may together comprise what may be referred to as the chemical reactor of the apparatus 100. The applicators 111 may be separated by a spatial separation (i.e. are disposed a predetermined distance apart and/or bounded by means of electromagnetic shielding). Each applicator 111 may be connected to a microwave generator 113 (see FIG. 4) and coupled to a load disposed in the vessel independently from other applicators. The load may be a liquid-based reactive medium, and the medium may at least partially absorb microwave energy. The microwave generator 113 may be configured to generate microwave energy to be emitted by the respective applicator 111 attached to the microwave generator 113. The apparatus may include a microwave window for each applicator 111, wherein the microwave window is transparent to the microwave energy and may be configured to allow the microwaves emitted by the respective applicator 111 into the vessel. It may be appreciated that the applicators 111 may also be disposed along the inner wall (i.e. the vessel) and the microwave windows can be formed as part of the inner wall. It may be appreciated that the applicators 111 may also be disposed along a bottom of the vessel and the microwave windows can be formed as part of the bottom of the vessel (see FIG. 1).

In an embodiment, the applicators 111 or parts of the applicators 111 located outside the chamber, may be bounded by one or more boundaries, like microwave shielding or materials that are reflective for microwave radiation.

In an embodiment, absorption of microwaves emitted by the applicators 111 in the load may make the load instrumental in preventing intercoupling issues via providing separation when the load size is bigger than a penetration depth of the emitted microwaves. Except for a boundary region of the subspace aligned to the load for each of the applicators 111, all other boundaries may be non-transparent for microwaves and may not absorb the microwave radiation of the respective applicator 111. Thus, the spatial separation makes it possible to use several of the applicators 111 without intercoupling issues and allows arithmetic summation of power from multiple of the microwave generators 113 without interference. Therefore, this total delivered power may be high and may uniformly and rapidly heat a load of large volume to a desired temperature.

In an embodiment, the apparatus may include a mixing device for uniformly mixing the load during a reaction process. For example, the mixing device may be a magnetically coupled stirrer, a pump, or a mechanically actuated impeller, among others.

In an embodiment, the gap between the vessel and the outer wall of the chamber may facilitate high-pressure processing. The load may be placed inside the vessel, which is in turn disposed inside the stronger and more reinforced chamber. Both the vessel and the chamber may be pressurized, and the pressure differential between the vessel and the chamber may be smaller than the pressure inside the vessel, while the pressure inside the vessel may be significantly high for processing.

In an embodiment, application of microwave radiation is performed via directional plane-wave modes to avoid cavity resonance mechanisms from the applicators 111 intercoupling.

In an embodiment, electric dimensions of the vessel may be larger than the wavelength of the emitted microwave radiation in a load’s medium, and resonant modes in the vessel are not excited (or their amplitudes are negligibly small). Such an operation regime, in addition to space separation, helps to provide absence of intercoupling when a large number of the applicators 111 are in use.

In an embodiment, plural separate subspaces for the respective applicators 111 may be disposed between the vessel’s outer surface and the chamber’s inner surface without necessity of hermetic sealing of one subspace from another. The applicators 111 may include electromagnetic shielding. The shielding of each applicator 111 from any other applicators may be sufficient for operation without intercoupling, and gaseous atmosphere can flow from a subspace of one applicator to the subspace of others. The boundary between subspaces may be manufactured in the form of a metallic diffraction grating, or metal slab with holes, or any other form that allows flowing of gas or vapor, but sufficiently prevents microwave intercoupling.

In an embodiment, the applicator may apply microwave energy to the load. In the MAOS reactors described herein, independent operation of the applicators 111 is considered, each of which is supplied by microwave energy from a separate, respective microwave generator. Generally, described herein: 1) the applicator 111 may be disposed in the gap between the external wall forming the chamber and the internal wall forming the vessel (also referred to as the pressure compensating volume); 2) The applicator 111 receives microwave energy from the generator 113 disposed outside the chamber; and 3) from the applicator 111, the microwave energy is transferred inside the vessel. Notably, the applicator 111 may comprise one or some of the devices and components described above (such as any of the described reference's antenna, waveguide component, etc.), in original or modified form, assuming however that the principle of spatial separation is to be satisfied in design of a desired reactor for MAOS having large processing volumes.

In an embodiment, two or more external generators can pump microwave energy into one subspace, and, through a single microwave window in the vessel's inner wall, all this energy is directed into the load. The applicator 111 may include an antenna, a radiator, a coupler, and other known elements by one skilled in the art. Two or more cross-polarized antennas can be included within the subspace of one of the applicators 111.

In an embodiment, each applicator 111 is disposed in a separate, individual housing attached to the vessel. The housings can be, for example, made of metal or another material with similar properties. The housings, each of which includes a respective applicator 111, may surround the vessel. In an embodiment, a hermetic sealing of each of the housings may be accommodated inside the chamber. In an embodiment, the hermetic sealing is not necessary and gas flow may circulate through the plurality of housings.

In an embodiment, the applicator 111 together with the microwave generator 113 may be disposed in the housing inside the chamber, and electrical power to the microwave generator 113 may be provided either from a battery included in the same housing or via an external power source.

In an embodiment, the applicator 111 and the microwave generator 113 together may be disposed in a sealed corpus that is disposed inside the medium (i.e. the load) within the vessel, while remote control of the applicator 111 can be performed via wireless communications or via a hardwire connection suitable for the harsh environment in the vessel.

In an embodiment, the inner wall forming the vessel may have different shapes. For example, the shape is a vertical cylinder with a flat bottom and a semi-spherical upper portion disposed inside the chamber having a similar shape. For example, the shape of the vessel is a horizontal cylinder and is disposed inside the chamber having a similar horizontal cylindrical shape and orientation. A volume of the load in the vessel may be considered a single-batch capacity for pharmaceutical production requirements. For example, a volume of the load in the vessel is equal to or more than 40 L, or equal to or more than 50 L, or equal to or more than 60 L, or equal to or more than 75 L, equal to or more than 90 L, or equal to or more than 100 L.

In an embodiment, a sequence of multiple horizontal chambers with horizontal cylindrical vessels disposed therein may be arranged and used for processing. The sequence forms a closed loop, and a liquid medium may circulate through this loop multiple times during the processing. In the closed loop, the sum of the loaded volumes in all the vessels in the loop may be considered as a single-batch capacity for the purpose of pharmaceutical production requirements. For example, a volume of the load in the vessel is equal to or more than 40 L, or equal to or more than 50 L, or equal to or more than 60 L, or equal to or more than 75 L, equal to or more than 90 L, or equal to or more than 100 L.

In an embodiment, spatial distribution of microwave energy from multiple applicators, together with mixing, agitation, or homogenization may provide homogeneous processing of the loaded media and leads to increased efficiency and higher yield. In an embodiment, such as the closed loop sequence, a stream of magnetic particles may provide mixing. In an embodiment, the mixing, agitation, or homogenization may be provided by use of acoustics/ultrasound/cavitation. Even distribution of microwave energy from multiple applicators, together with mixing, agitation, or homogenization, may provide homogeneous processing of the loaded media and leads to increased efficiency and higher yield.

Examples

Example 1—FIG. 1 is a projection of the bottom of the vessel with a geometrical grid of squares, according to an embodiment of the present disclosure. In an embodiment, the inner wall forming the vessel may have a vertical cylindrical shape with a flat bottom and a semi-spherical upper portion opposite the flat bottom. The vessel may be disposed inside the chamber having a vertical cylindrical shape. The apparatus 100 may include horizontal bars for supporting the vessel; the vessel's bottom may be disposed above a floor of the chamber and not in contact with the floor. The housings, each of which having a respective applicator 111 disposed therein, may be disposed beneath the vessel. Each of the applicators 111 in the respective housing may operate at a microwave frequency of approximately 2.45 GHz. Another applicator 111, operating at frequency of 915 MHz, may be disposed proximal to and aligned with the upper portion of the vessel.

In Example 1, the radius "r" of an inner circle of the vessel's bottom is equal to 4.25 dm (decimeters), and the area "a" of the inner circle is equal to 56.7 sq dm (square decimeters). "H" is the height of the media (i.e. the load) that is loaded in the vessel. The media may be a slurry or a liquid. A volume "V" of the load is equal to a multiplied by H, which results in 70 L for an H of 1.25 dm and 100 L for an H of 1.75 dm.

The microwave power that may be delivered to the load from the bottom side of the vessel is determined herein. In a free space, a half-wavelength of microwave radiation of applicators 111 arranged on the bottom of the vessel is 6.1 cm. As shown in the geometrical projection of FIG. 1 of the grid of squares (having a side length of 6.1 cm) on the inner circle, there will be 120 nodes inside the inner circle having a 4.25 dm radius; each node may be suitable for one of the applicators 111. Each node is considered suitable for placing one of the microwave applicators 111 with the 2.45 GHz frequency. Therefore, up to 120 applicators 111 may be aligned to the vessel bottom so they will operate without intercoupling. When each applicator 111 has a power of 0.3 kW, then a total power of all the applicators 111 is P=120×0.3=36 kW. The applicator 111 of such power can be constructed with a built-in microwave solid-state oscillator inside the housing. Alternatively, the feeding microwave generator 113 may be located outside chamber and connected to the housing via a hardline connection.

For the applicators 111 arranged proximal to the upper portion of the vessel, a frequency of 915 MHz may be used with high power generators up to 120 kW of continuous power. For Example 1, the power of the applicators 111 was 50 kW. Thus, the total microwave power in the system of Example 1 is equal to 36 kW+50 kW=86 kW. A microwave power density equals 86 kW/70 L=1.23 kW/L for a load with the height of 1.25 dm, or 86 kW/100 L=0.86 kW/L for a load with the height of 1.75 dm.

Example 2—In an embodiment, similar to Example 1, the inner wall forming the vessel may have the cylindrical shape with the flat bottom and the semi-spherical upper portion opposite the flat bottom. The vessel may be disposed inside the chamber having a vertical cylindrical shape. The apparatus 100 of this embodiment may not include horizontal bars for supporting the vessel and instead the vessel's bottom may be disposed on the floor of the chamber. That is, the vessel's bottom is in contact with the floor of the chamber. The housings, each of which having a respective applicator 111 disposed therein, may be disposed beneath the vessel. Each of the applicators 111 in the respective housing may operate at a microwave frequency of approximately 2.45 GHz. Another applicator 111, operating at frequency of 915 MHz, may be disposed proximal to and aligned with the upper portion of the vessel. Therefore, up to 24 of the applicators 111 may be aligned at the floating slab such that the applicators 111 may operate without intercoupling.

Figure 2:
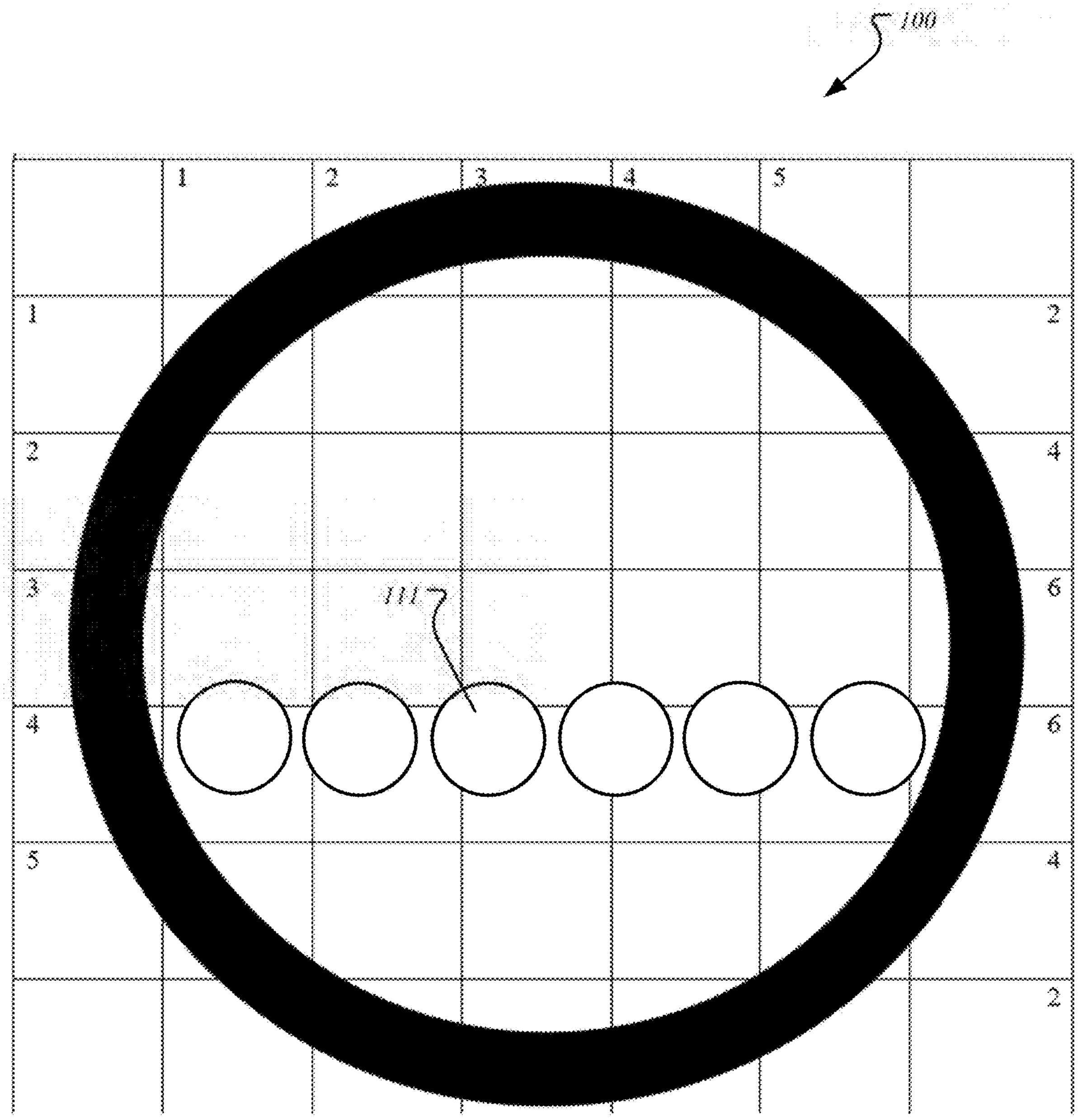
FIG. 2 is a projection of a floating slab with a geometrical grid of squares, according to an embodiment of the present disclosure.

Example 3—FIG. 2 is a projection of a floating slab with a geometrical grid of squares, according to an embodiment of the present disclosure. In an embodiment, similar to Example 1, the inner wall forming the vessel may have the vertical cylindrical shape with the flat bottom and the semi-spherical upper portion opposite the flat bottom. The vessel may be disposed inside the chamber having a vertical cylindrical shape. The vessel may be disposed on the floor of the chamber similar to Example 2 and the geometrical dimensions of the vessel and the load are similar to Example 1 and Example 2. The 120 applicators 111, each of which have a power of 0.3 kW at 2.45 GHz, may deliver the total power of 36 kW from the direction of the bottom of the vessel.

Here, the apparatus 100 may include a slab that floats on a surface of the load in the vessel, wherein the load may be in a liquid state. The slab may have a diameter of 75 cm and the microwave applicators 111 operating at 915 MHz (similar to those arranged towards the upper portion in Example 1 and Example 2) may be disposed on the slab, wherein each applicator 111 is disposed in a respective housing.

The microwave power that may be delivered to the load from the floating slab is determined herein. In a free space, a half-wavelength of microwave radiation for the applicators 111 disposed proximal to the slab is approximately 15 cm. As shown in the geometrical projection of FIG. 2 of the grid of squares (having a side length of 15 cm), there will be 24 nodes inside the circle of 75 cm diameter. Each node is considered suitable for placing of one microwave applicator 111 with the 915 MHz frequency. Therefore, up to 24 of the applicators 111 may be aligned to the vessel bottom so they will operate without intercoupling. When each applicator has a power of 0.3 kW, then total power of all applicators 111 proximal to the floating slab is 24 kW. The applicator 111 of such power can be constructed with a built-in microwave solid-state oscillator inside the housing. Alternatively, the feeding microwave generator 113 may be located outside chamber and connected to the housing via a hardline connection.

The total microwave power in the system of Example 3 is equal to 36 kW+24 kW 60 kW. A microwave power density equals 60 kW/70 L=0.86 kW/L for a load with a height of 1.25 dm, or 60 kW/100 L=0.60 kW/L for a load with a height of 1.75 dm.

Example 4—In an embodiment, similar to Example 1, the inner wall forming the vessel may have the vertical cylindrical shape with the flat bottom and the semi-spherical upper portion opposite the flat bottom. The vessel may be disposed inside the chamber having a vertical cylindrical shape. The apparatus 100 may include the horizontal bars for supporting the vessel; the vessel's bottom may be disposed above the floor of the chamber and not in contact with the floor. The geometrical dimensions of the vessel and the load are similar to Example 1, Example 2, and Example 3.

The 120 applicators 111, each of which have a power of 0.3 kW at 2.45 GHz, may deliver a total power of 36 kW from the direction of the bottom of the vessel. Here, a single applicator 111 of 50 kW at 915 MHz delivers the microwave power to the load from the upper portion of the vessel. In addition to microwaves, ultrasound participates in processing a liquid load in the vessel. An ultrasonic generator (at least one ultrasonic generator) may be arranged on the cylindrical wall forming the vessel and directed at the load. In Example 4, acoustic waves from the ultrasound generator initially propagates in the horizontal direction, while microwaves from both the upper and lower applicators 111 initially propagate vertically (when the apparatus 100 is aligned vertically along a direction of the cylindrical shape being upright). Thus, the ultrasound generator can be arranged with a height of 3 to 6 cm from the vessel's floor.

Figure 3:
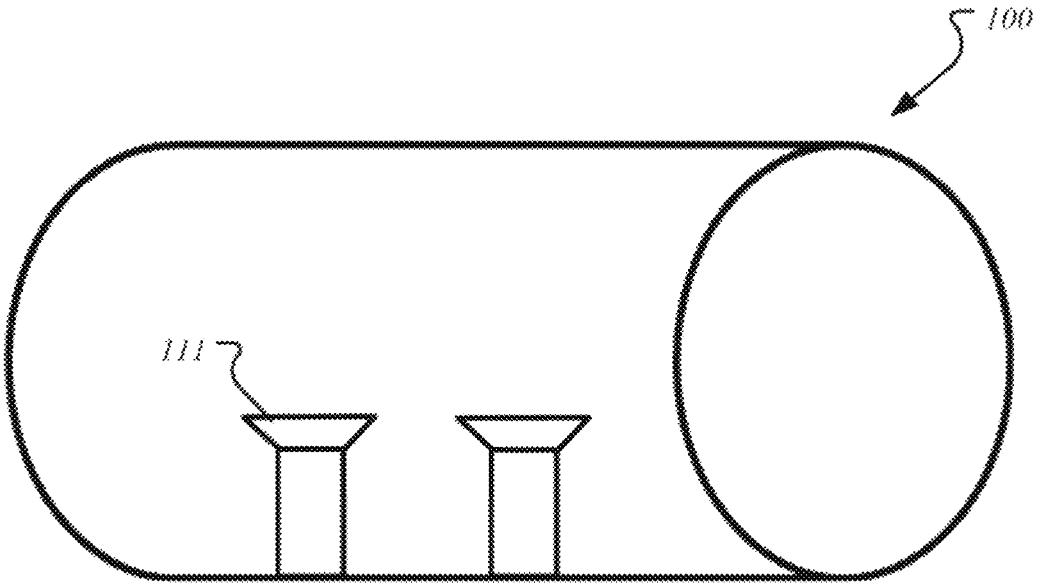
FIG. 3 is a schematic of the apparatus 100 having a horizontal arrangement, according to an embodiment of the present disclosure.

Example 5—FIG. 3 is a schematic of the apparatus 100 having a horizontal arrangement, according to an embodiment of the present disclosure. In an embodiment, the inner wall forming the vessel may have a horizontal cylindrical shape with a flat first end. A second end opposite the flat first end may be also flat or a semi-spherical shape. The vessel may be disposed inside the chamber having a similar horizontal cylindrical shape. As shown, the applicators 111 may be disposed inside the horizontal cylindrical chamber and on the wall of the cylindrical vessel. On this wall, each applicator 111 occupies an area within a small square having a side length approximately equal to a half-wavelength. A number of the applicators 111 per the vessel's length may be linearly proportional to the length of the vessel (the length being similar to the height in previous examples).

In an embodiment, when the vessel's inner diameter is equal to two wavelengths and each applicator 111 has power P, the microwave power density in the vessel's volume may be equal to 8P divided by the wavelength cubed. For estimation, one may assume each applicator 111 outputs 0.3 kW at 2.45 GHz or 1 kW at 915 MHz. Now, with power assumptions and geometrical configuration as described above, a scale of the reactor for processing the liquid load's volume of 100 L and 1000 L may be determined: when l=22 dm and 2.45 GHz, the volume is 100 L with 12 applicators 111 along the circular cross-section. Along the vessel's length, there may be 2(l/f) applicators 111. The total number N may then be 24*(22/1.2)=440. The volume of the vessel may be equal to 1000 L for the cylinder's length l of 35 dm at 915 MHz or 220 dm at 2.45 GHz. Ultrasonic generators may be positioned on flat ends and be used for mixing and adding energy. For the 1000 L vessel, the number of microwave applicators may be 280 at 915 MHz or 4400 at 2.45

GHz. The closed-loop 1000 L reactor may be a toroid with a radius of 0.55 m at 915 MHz or 3.35 m at 2.45 GHz. Circular flow of magnetic particles may be used for mixing, agitation, or homogenization of the load.

Example 6—In an embodiment, as in Example 5, the volume of the vessel may be 100 L with 440 applicators 111 outputting 0.3 kW at 2.45 GHz. In addition to the vessel's wall applicators 111, internal applicators 111 (with frequency 915 MHz) may irradiate from inside the vessel. Along the vessel axis there may be, for example, 4 internal applicators 111 per meter, or a total of 9 applicators 111 per full 22 dm length.

Example 7—as previously described, the apparatus 100 for performing batchwise chemical reactions uses microwave energy (microwave radiation). The apparatus 100 may include a chemical reactor (also known as the vessel). The vessel may be defined by the inner wall that separates an inner part of the reactor from its surrounding chamber that is defined by the outer wall. For performing batchwise chemical reactions, the reactive medium (i.e. the load) may be loaded into the inner part of the reactor, or the vessel. At least one component of the reactive medium is liquid. A mixing device (e.g., a magnetically coupled stirrer) may be provided as a part of the apparatus 100 to support uniformity of the reactive medium. The inner wall may include microwave windows that are designed for microwave energy introduction into the inner part of the vessel. For using microwave energy to control the chemical reactions, at least one component of the reactive medium may absorb microwave energy, and thus the microwave energy may be absorbed by the reactive medium, and the reactive medium performs as a distributed load for microwave radiation.

The microwave absorption properties of the medium may be characterized by the microwave radiation penetration depth, defined as the depth at which the intensity of the radiation inside the material falls to 1/e (0.37) of its original value at the surface. The microwave penetration depth may change during the chemical process cycle that includes the reaction time, the medium preparation (e.g. heating) time, and the post-processing (e.g. cooling) time. There may be a longest penetration depth during the time of the process control by the microwave energy. The microwave energy may be provided by the microwave applicators 111 connected to microwave generators 113, wherein each applicator 111 is powered by at least one microwave generator 113.

The microwave energy may be provided to the load by the microwave applicators 111 through the microwave-transparent windows, or the applicators 111 may be at least partially disposed inside the vessel, wherein the applicators may be connected to the microwave generators 113 located outside the reactor. A minimum distance through the load (medium) between every two of the applicators 111 or between the corresponding windows when the applicators 111 are located outside the reactor, may be longer than a fixed distance that is determined by the longest penetration depth of microwave radiation. The minimum distance may be selected depending on the sensitivity of the microwave generators 13 to the external microwave radiation and may reach 1, 1.5, or 2 times the length of the longest penetration depth. The maximum distance may be limited by the physical dimensions of the vessel. The actual distance may be selected to ensure required microwave power level inside the vessel and its value can be in the range between the minimum and maximum distances.

That is, in an embodiment, when the applicators 111 are disposed inside the vessel, a distance between locations of the applicators 111 within the vessel is, for example, 1, or 1.5, or 2 times longer than a longest penetration depth of the microwave energy into the load among all steps of a chemical process cycle that include emitting the microwave energy at the load by the applicators 111. In an embodiment, when the applicators 111 are disposed outside the vessel, a distance between the microwave windows is, for example, 1, or 1.5, or 2 times longer than a longest penetration depth of the microwave energy into the load among all steps of a chemical process cycle that include emitting the microwave energy at the load by the applicators 111.

In an embodiment, applicators 111 for different frequencies of microwave radiation may be used, e.g., for 2.45 GHz and 0.915 GHz, and may be installed proximal to one another. For example, the applicators 111 may be configured to all emit at 2.45 GHz. For example, the applicators 111 may be configured to all emit at 915 MHz. For example, a portion of the applicators 111 may be configured to emit at 2.45 GHz while a remainder of the applicators 111 may be configured to emit at 915 MHz. As penetration depth depends on the microwave frequency, the longest penetration depth should be determined after consideration of both frequencies. The fixed distance and the minimum distance through the load (media) between these two applicators 111 or between the corresponding windows when the applicators 111 are located outside the reactor may be selected as described above considering the longest penetration depth determined after consideration of both frequencies.

In an embodiment, the microwave applicators 111 or their parts located outside the vessel may be bounded (surrounded) by one or more microwave-reflecting boundaries that may be non-transparent for microwaves (e.g. microwave shielding).

In an embodiment, the distance between the applicator 111 outside the reactor and the microwave shielding may be fixed and equal to the length A that is determined by the wavelength of microwave radiation X in the space surrounding the microwave applicator 111. A dependence between A and X is described by a formula:

$$A = (1/2N + 1/4)X,$$

where N is any non-negative integer. Separation of the applicators 111 by the distributed load and by microwave shielding ensures an almost complete absence of electromagnetic intercoupling between the applicators 111. Because of the almost complete absence of electromagnetic intercoupling between the applicators 111, it is possible to utilize independent automatic tuning of the applicators 111 and/or the microwave generators to minimize microwave power reflection to the microwave generators. Though microwave energy losses may exist because of an imperfect coupling between each microwave generator and the distributed load and losses inside the applicator 111 and a waveguide between the applicator 111 and the microwave generator, the almost complete absence of electromagnetic intercoupling between the applicators 111 allows arithmetic summarizing of power from the applicators 111 delivered to the distributed load (medium). A total microwave power delivered from all applicators 111 to the load is equal to P, the load's volume is equal to V, and a ratio of P/V is in the range from 0.05 kW/L to 2.5 kW/L.

In an embodiment, a pressure-compensating chamber may surround the vessel, and the microwave applicators 111 may be disposed inside the chamber while the microwave generators are located outside the chamber. The vessel and the chamber may be pressurized. The chamber provides thermal insulation as well of the vessel from the external environment.

In an embodiment, in addition to microwaves, processing of the load further comprises at least one of the following modalities: heating using an induction heater, or an electrical resistance heater, or a heat exchanger with a heated fluid; irradiation using radiation from radioactive material or a beam of charged or neutral high energy particles; irradiation by a laser; and ultrasound application, among others.

Figure 4A:
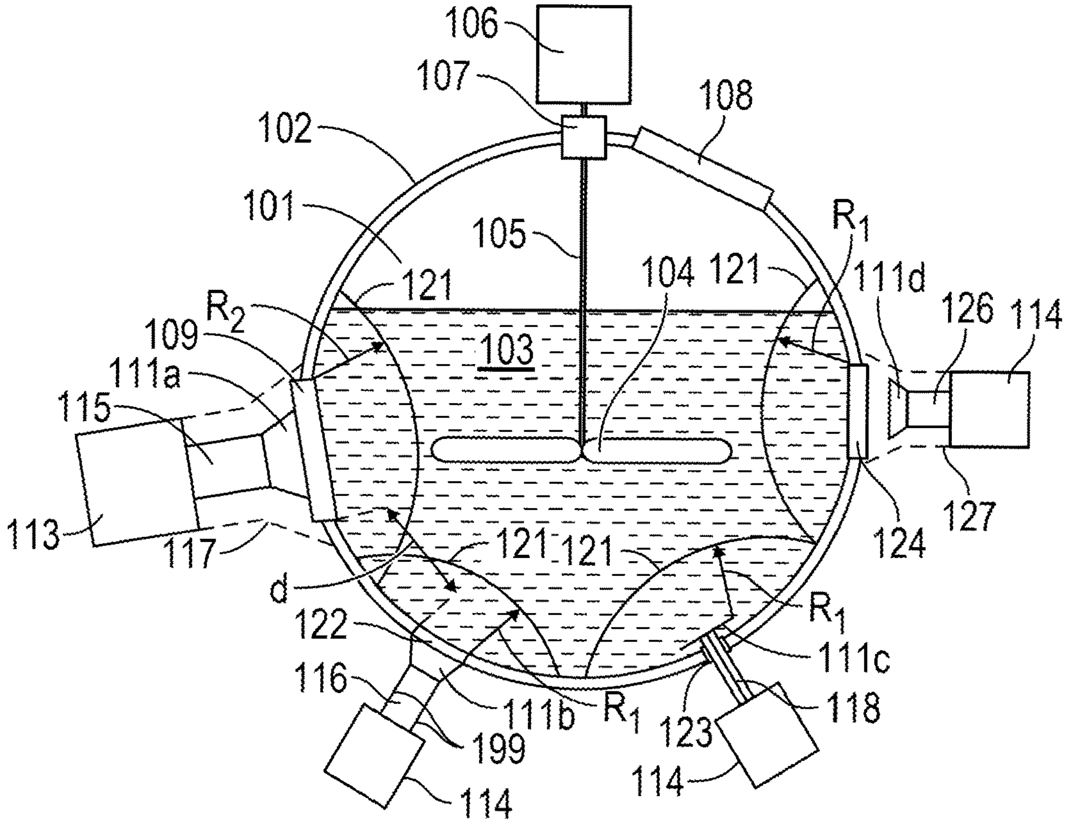
FIG. 4A-4C are schematic diagrams of the apparatus 100 for performing batchwise chemical reactions using microwave energy, according to an embodiment of the present disclosure.
Figure 4B:
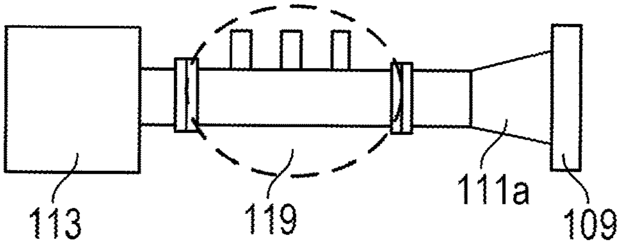
Figure 4C:
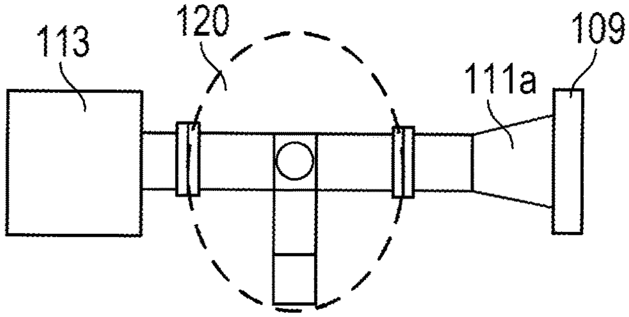

FIG. 4A-4C are schematic diagrams of the apparatus 100 for performing batchwise chemical reactions using microwave energy, according to an embodiment of the present disclosure. In an embodiment, the chamber of the apparatus 100 is not shown. A spheroidal shaped vessel 101 may include a wall 102 that defines the volume of the vessel 101, the vessel 101 configured to hold a liquid-based reactive media 103, the media 103 having the property of absorbing microwave energy. The wall 102 may include an opening for loading-unloading operations that may be covered with a lid 108. To support uniformity of the liquid-based reactive media 103, the vessel 101 may also include a stirrer 104 fixed on a shaft 105 that may be rotated by a motor 106 through a magnetic coupling 107. The wall 102 may include microwave windows 109, 122, 123, and 124 that are designed for microwave energy introduction into the inner part of the vessel 101. The microwave energy may be provided by microwave applicators 111*a*, 111*b*, 111*c*, and 111*d* connected to microwave generators 113, 114 and aligned to irradiate the media 103 inside the vessel 101.

In an embodiment, the microwave applicators 111 may be formed as horn antennae of different sizes that correspond to the different wavelengths of the microwave generators 114. The horn antennae applicator 111*a* may be directed to and terminated at the microwave window 109. The horn antennae applicator 111*d* may be directed to the microwave window 124 but may not reach it. The horn antennae applicator 111*b* may be "plugged" by the microwave window 122. The microwave applicator 111*c* may be made as a patch antenna installed inside the vessel 101.

In an embodiment, the microwave generators 113, 114 may provide microwave energy to the horn antennae applicators 111*a*, 111*b*, 111*d* through the waveguides 115, 116, 126 of the appropriate sizes. For reduction of the influence of the microwave power reflected from the boundaries between the window 109 (122, 124) and the horn antenna applicator 111*a* (111*b*, 111*c*) and between the window 109 (122, 124) and the media 103, the waveguides 115, 116, 126 can comprise a tuner 119 (see FIG. 4B) or a Y-circulator with a nonreflecting load 120 (see FIG. 4C).

In an embodiment, the microwave applicators 111*a*, 111*d* located outside the reactor may be bounded by non-absorbing boundaries (i.e. microwave shielding) 117 and 127 that are non-transparent for microwave radiation. The microwave applicator 111*b* also located outside the reactor may have a metal wall 199 that connects the microwave generator 114 and the reactor wall 102. This wall 199 plays the role of the non-absorbing boundary (microwave shielding) that may be non-transparent for microwaves. The patch antenna applicator 111*c* may be connected to the microwave generator 114 by a coaxial line 118 and the outer cylindrical conductor of this line may provide microwave shielding. Microwave absorption properties of the media 103 may be determined by the microwave radiation penetration depth that changes during the chemical process cycle. There may be a longest penetration depth ($R_1$ or $R_2$ depending on the microwave frequency) during the time of the chemical process controlled by the microwave energy. Boundaries 121 shown in FIG. 4A may enclose the areas within the longest penetration depths $R_1$ and $R_2$. A fixed distance may be selected depending on the sensitivity of the microwave generators 113, 114 to the external microwave radiation and may reach 1, 1.5, or 2 times the length of the longest penetration depth. A minimal distance through the media "d" between microwave windows 109 may be set longer than the fixed distance.

Though microwave energy losses may exist because of an imperfect coupling between each microwave generator 113, 114 and the media 103, separation of microwave applicators 111 by the media 103 and by microwave shielding ensures an almost complete absence of electromagnetic intercoupling between the applicators 111 and allows arithmetic summation of power from the applicators 111 delivered to the media 103, as well as simple independent automatic tuning of the applicators 111 and/or the microwave generators 113, 114 to minimize microwave power reflection to the generators 113, 114. That is, the microwave shielding can enclose a respective microwave applicator 111 disposed in the gap such that each microwave applicator 111 is shielded from the other.

Figure 5:
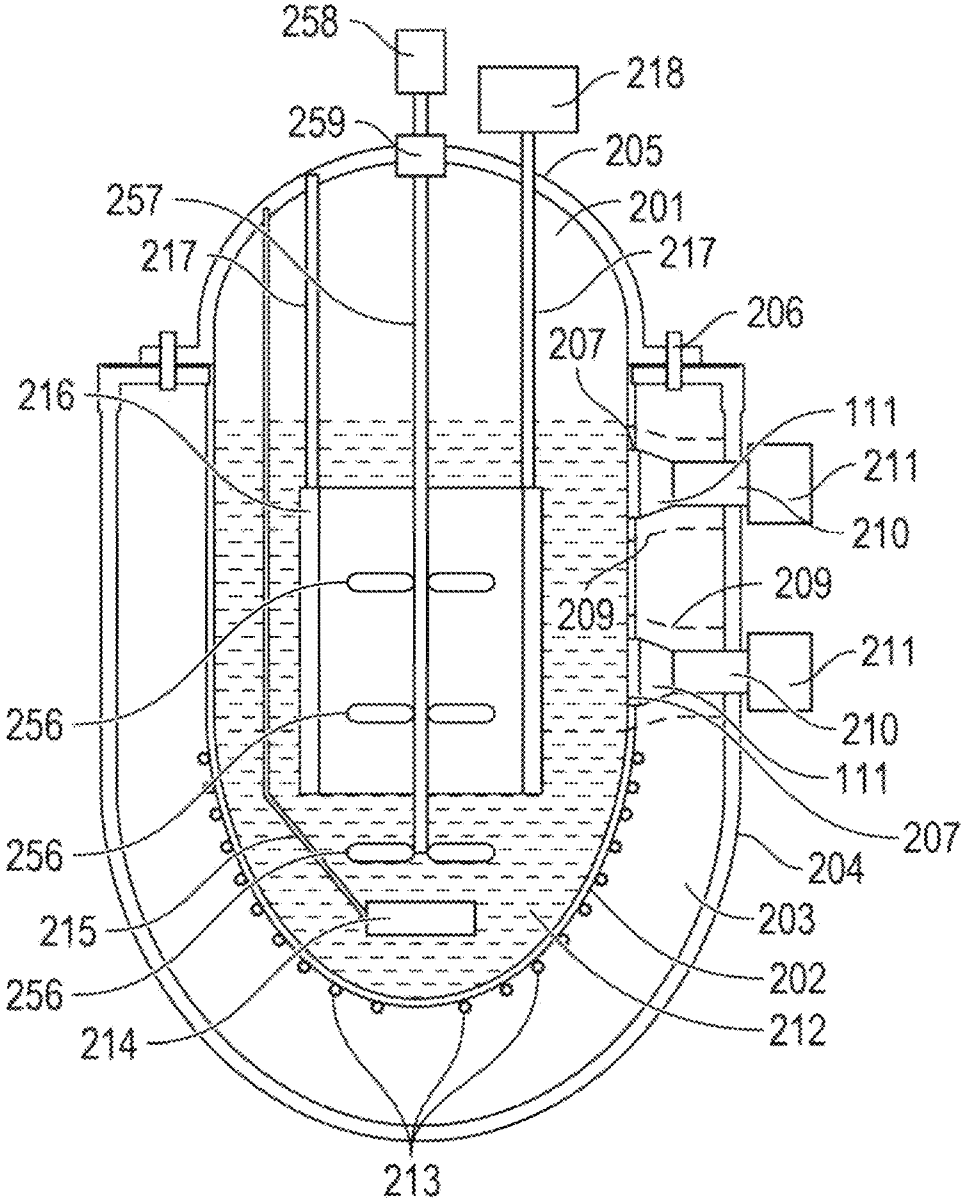
FIG. 5 is a schematic of the apparatus 100 with an elongated shape, according to an embodiment of the present disclosure.

FIG. 5 is a schematic of the apparatus 100 with an elongated shape, according to an embodiment of the present disclosure. In an embodiment, a vessel 201 may include a lid 205 that is thick enough to withstand high pressure exerted during the whole cycle of a chemical process. A wall 202 of the vessel 201 is thin and may not be able to withstand high pressure during the whole cycle of the chemical process. Therefore, a pressure-compensating chamber 203 surrounds the thin wall vessel 201, and a wall 204 of the chamber 203 may be formed thick enough to withstand the high pressure during the whole cycle of the chemical process. That is, the chamber 203 may be pressurized, for example via a gas, liquid, or other fluid, to equalize against the pressure in the vessel 201. As the wall 204 may not exposed to the chemical process, the wall 204 may be manufactured from less expensive alloy and be thicker. When the vessel 201 is closed for the process, the lid 205 may be connected to the wall 204 of the chamber 203 by multiple locks 206 that can withstand pressure during the whole cycle of the chemical process. The pressure inside the chamber 203 may be regulated by compressed gas, e.g., nitrogen, so that the differential pressure between the vessel 201 and the chamber 203 during the whole cycle of the chemical process is small enough and safe for the thin wall 202 of the vessel 201 and microwave windows 207. Microwave applicators 111 may be disposed inside the chamber 203 while the microwave generators 211 may be disposed outside the chamber 203. The microwave generators 211 may provide microwave energy to the microwave applicators 111 made as horn antennae through the waveguides 210. The microwave applicators 111 and the waveguides 210 disposed outside the vessel 201 may be bounded by boundaries (microwave shielding) 209 that are non-transparent for microwaves and do not absorb microwave radiation. The reactor wall 202 may surround an inner part of the vessel 201 with a reactive liquid-based medium 212 that has the property of absorbing microwave energy.

In an embodiment, to support uniformity of the reactive medium 212, the chemical reactor 201 may include a stirrer with multiple impellers 256 fixed on a shaft 257 that is rotated by a motor 258 through a magnetic coupling 259 that is fixed on the lid 205.

In an embodiment, the apparatus 100 may also include a heater 213 (e.g. resistive electric, induction, or steam heater, among others) that may be in thermal contact with the wall 202 of the lower part of the vessel 201. Preheating the media 212 using the heater 213 may allow reducing a temperature range when the operation of the microwave applicators 111 is required, and thus provide better coupling between the media 212 and microwave generators 211 without tuning. Additionally, the apparatus 100 may include a radioactive material 214 fixed on an arm 215 attached to the lid 205. Radiation from the radioactive material 214 may provide a constant rate of generation of chemical radicals in the reactive media 212. Together with the precise and uniform temperature control provided by the microwave energy and the stirrer, the apparatus 100 allows precise control of a chemical reaction rate.

In an embodiment, the apparatus 100 may include an ultrasound transducer 216 having a cylindrical shape fixed on arms 217 attached to the lid 205. The ultrasound transducer 216 may be powered by an ultrasonic generator 218. A combination of microwave power and ultrasound oscillations is beneficial for the control of some chemical processes.

Figure 6:
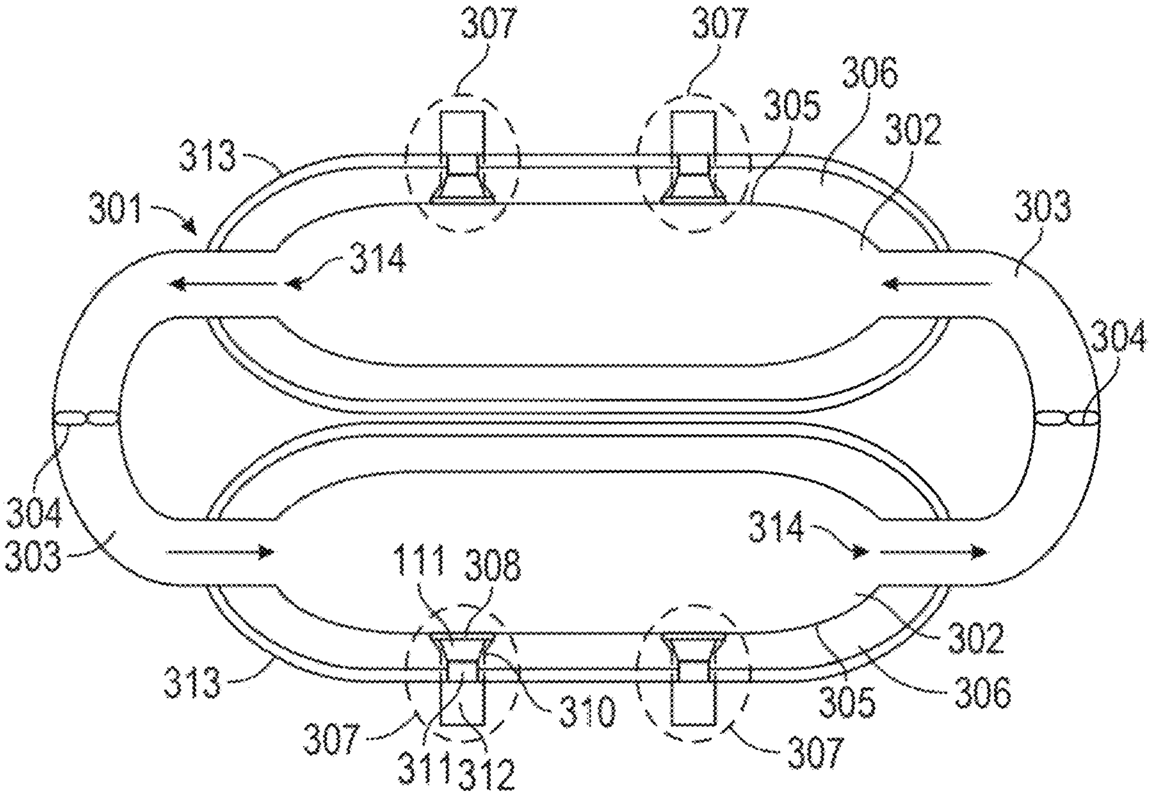
FIG. 6 is a schematic of a closed loop configuration of the apparatus 100, according to an embodiment of the present disclosure.

FIG. 6 is a schematic of a closed loop configuration of the apparatus 100, according to an embodiment of the present disclosure. In an embodiment, the apparatus 100 may include a double-vessel chemical reactor. That is, the apparatus 100 may include two or more internal vessels 302 located along a same horizontal plane. The vessels 302 may be fluidly connected using pipes 303 with pumps 304 that provide circulation of a liquid-based medium 314 in the vessels 302 and connecting hydraulics. Similar to the apparatus 100 previously described, walls 305 of the vessels 302 may be thin and cannot withstand pressure during the whole cycle of the chemical process. Therefore, pressure compensating chambers 306 may surround the thin wall vessels 302, and walls 313 of the chambers 306 may be formed thick enough to withstand pressure during the whole cycle of the chemical process. As the walls 313 are not exposed to the chemical process, they may be manufactured from less expensive alloy and thicker. The pressure inside the chambers 306 is regulated by compressed gas, e.g., nitrogen, so that the differential pressure between the vessels 302 and the chambers 306 during the whole cycle of the chemical process is small enough and safe for the thin walls 305 of the reactors and microwave windows 308.

In an embodiment, the apparatus 100 may include several sets 307 of microwave-related devices and parts. Each set 307 may include the microwave window 308 in the vessel wall 305, the microwave applicator 111, a waveguide 311, a microwave generator 312, and a boundary (microwave shielding) 310 that may be non-transparent for microwaves and do not absorb microwave radiation. The applicators 111, the waveguide elements 311, and the boundaries 310 may be located inside the chambers 306 while the microwave generators 312 may be located outside the chambers 306. The microwave generators 312 may provide microwave energy to the microwave applicators 111 made as horn antennae through the waveguides 311. The reactor wall 305 may surround an inner part of the vessel 302 with a liquid-based reactive medium 314 that may have the property of absorbing microwave energy. To support uniformity of the reactive media 314, the apparatus 100 may include the pumps 304.

Performance Simulations

The apparatus 100 includes a 35 cm radius vessel loaded with water-based liquid reagents, wherein a chemical reaction is carried out in the presence of strong radio frequency (RF) fields. These RF fields are delivered to the vessel via an RF coupler that matches the circular waveguide (where the transverse electric (TE) mode is propagating) with the liquid medium where the electromagnetic waves are transformed into plane waves. Another function of the RF coupler is the physical separation of the liquid medium from the air-filled/pressurized/vacuum waveguide interface. The following electromagnetic simulations demonstrate the process of electromagnetic (EM) separation of multiple RF couplers attached to the vessel. RF and microwaves may be used interchangeably and do not define a particular frequency band, but rather that the wavelength of the signal is comparable with the size of the system, and the system may not be an ideal system without irreversible dissipation of energy, such that the classic lumped element theory is not applicable.

Typical Solvents for the Liquid-Phase Microwave Chemistry

Most reactions relevant to MAOS take place in a liquid phase, or when a liquid and a gas phase (including said liquid's vapor) coexist under pressure, or the liquid and the gas are in equilibrium at high pressure. Prior to a reaction's beginning, the reagents, from which MAOS is to start, are dissolved in a solvent, and the reagents' concentrations in said solvent are well below 10% in a typical case. Dielectric properties of this solvent have an influence on the MAOS time, because the better the solvent absorbs microwaves, the faster the liquid is heated and the faster the reaction is completed.

The dielectric constant, dipole moment, dielectric loss, tangent delta, and dielectric relaxation time all contribute to an individual solvent's absorbing characteristics in the microwave radiation frequency range. The dielectric constant (ε) is also known as the relative permittivity. The ability of a substance to convert electromagnetic energy into heat at a given frequency and temperature is determined by the following equation: $\tan \delta = \varepsilon''/\varepsilon$. Tangent delta (δ), or loss tangent, is the dissipation factor of the sample or how efficiently microwave energy is converted into thermal energy. It is defined as the ratio of the dielectric loss, or complexed permittivity (ε'), to the dielectric constant (ε). Dielectric loss is the amount of input microwave energy that is lost to the sample by being dissipated as heat. It is this value, ε", that provides a decisive criterion for selection of a particular solvent for organic chemistry based on microwave coupling efficiency.

Dielectric properties of irradiated liquid samples may depend both on temperature and microwave frequency.

There are commonly used solvents in MAOS; data for the tangent delta, dielectric constant, and dielectric loss values of 30 common solvents are shown in Table 1 of Solvent Choice for Microwave Synthesis. The solvents are categorized into three different groups: high, medium, and low absorbing solvents. Eight high absorbing solvents have the dielectric loss ε" ranging from 14 for 2-Propanol to 50 for Ethylene Glycol. The medium group has ε" in the range from 1 to 10. For the low absorbing solvents, such as chloroform and 7 others, the value of ε" is less than 0.5. All the data above are for the microwave frequency of 2.45 GHz at room temperature and pressure. Pure water at room temperature and atmospheric pressure belongs to a medium group (ε"=10).

TABLE 1

| Electromagnetic parameters of materials used in simulations | | | |
|---|---|---|---|
| Material | Water | Alumina | Alumina |
| Purity | | 99.5% | 96% |
| Relative permittivity | 78 | 9.9 | 9.4 |
| Relative permeability | 1 | 1 | 1 |
| Dielectric loss-tangent | | 0.0001 | 0.0004 |
| Electrical conductivity | 1.59 S/m | | |

In some cases, for performing the chemical process, the initial reagents are placed into the solvent that is a low absorbing solvent without additives, and additional small balls (so-called "susceptors" having the property of high microwave absorption) are also introduced into this solvent. Said balls do not participate in any of the chemical reactions, but by absorbing microwave energy, they provide volumetric heating for the whole media where the reagents participate in said chemical process.

Water, being common and applicable for organic synthesis, was specifically studied with respect to its dielectric properties. For industrially used microwave frequencies of 915 MHz and 2.45 GHz, the different physical states of water were analyzed, such as ice (solid), liquid, ice slurry with liquid, vapor, liquid-vapor mix, and other inter-phase mixtures. Dependencies were found for complex permittivity based on a proportion of liquid in a mixture, temperature, pressure, and presence of additives from salts in sea water to metabolites in biofluids. With respect to MAOS in "green chemistry", it is especially important that supercritical water can be an efficient solvent and the reaction medium provides an accelerated synthesis of a desired organic compound with minimal use of catalysts or without them at all.

For further numerical experiments, pure water without additives was considered as a liquid load under microwave irradiation, and, in some situations, water vapor coexists with said liquid. Such assumptions are sufficient to study a spatial separation at multi-generator irradiation of large load and to predict for complicated cases (inter-phase mixtures, mix of solvents, use of additives, etc.).

Coupler Antenna

The RF coupler serves as an antenna that transmits the EM waves into the water in the vessel. As mentioned previously, the design criteria are the following: the system has a physical separation between water and air; minimal internal reflections; and good coupling between a circular air-filled waveguide and water. The operating frequency of 2.45 GHz was chosen to meet the current standards for industrial frequency bands and to ensure availability of readily available power sources.

Figure 7A:
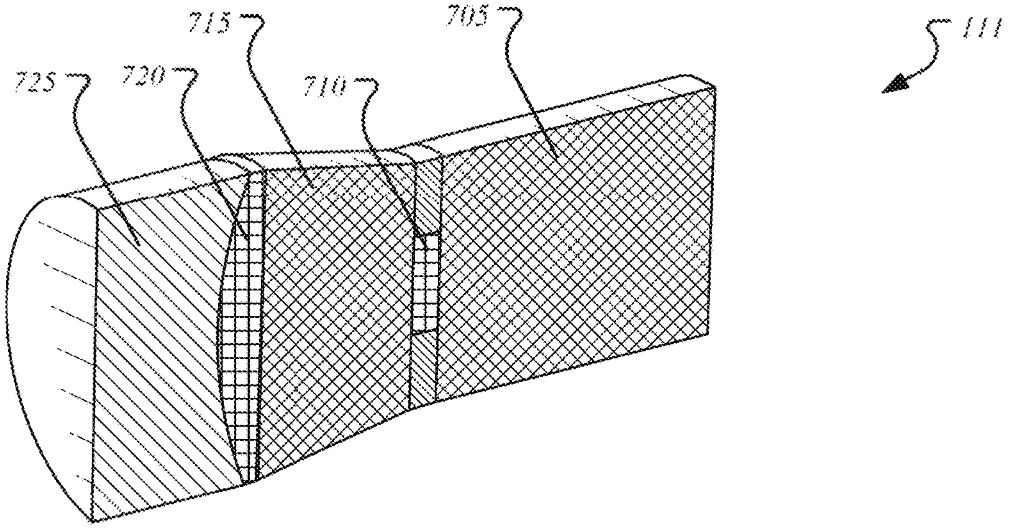
FIG. 7A is a schematic of a design for the applicator, according to an embodiment of the present disclosure.

FIG. 7A is a schematic of a design for the applicator 111, according to an embodiment of the present disclosure. In an embodiment, the applicator 111 includes an 8 cm diameter circular waveguide 705 (wherein such a diameter maintains the cut-off frequency of the waveguide 705, i.e. 2.2 GHz, below the operating frequency of the apparatus 100), a matching alumina window 710 that compensates for the power reflections from the water media and other coupling elements, a horn antenna 715 that transforms the waveguide 705 modes into plane waves and improves directivity of the radiated signal, and a dielectric spherical lens 720 to focus the radiated signal and create a physical separation between the air-filled waveguide 705 and liquid media 725 (such as water). The waveguide 705 may be disposed at a first end of the applicator 111 and the lens 720 may be disposed at a second end of the applicator 111. In between, the alumina window 710 may be disposed proximal to the waveguide 705 and the horn antenna 715 may be disposed proximal to the lens 720 such that the horn antenna 715 separates (but is in contact with) the lens 720 and the alumina window 710 and the alumina window 710 separates (but is in contact with) the horn antenna 715 and the waveguide 705. As previously described, the second end of the applicator 111 may be directed at the vessel. The waveguide 705 may be configured to direct microwave energy through the applicators 111 from the second end to the first end of the applicator 111.

Alumina is commonly used in high power couplers for accelerators. However, other materials with similar properties, such as rexolite of PTFE, can be used. Certain properties of the materials used in simulations are shown in Table 1. One of the advantages of the present disclosure is that more than one barrier is provided to separate the liquid media 725 from the waveguide 705, i.e., the lens 720 and the window 710, which ensures that the liquid media 725 does not leak into the waveguide 705. A gap in place of the window 710 can also be filled with pressurized air to compensate for the water pressure. The window 710 may beneficially be brazed to the waveguide 705.

Figure 7B:
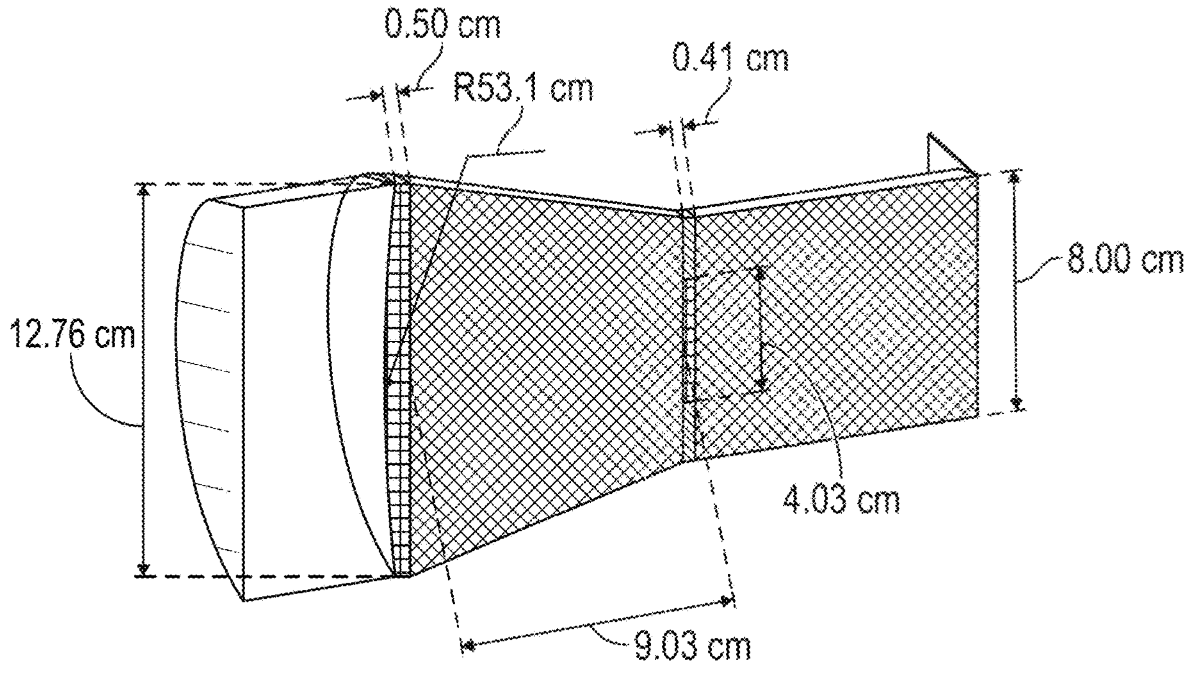
FIG. 7B is a schematic of the optimized dimensions for the design of the applicator, according to an embodiment of the present disclosure.

FIG. 7B is a schematic of the optimized dimensions for the design of the applicator 111, according to an embodiment of the present disclosure.

Figure 7C:
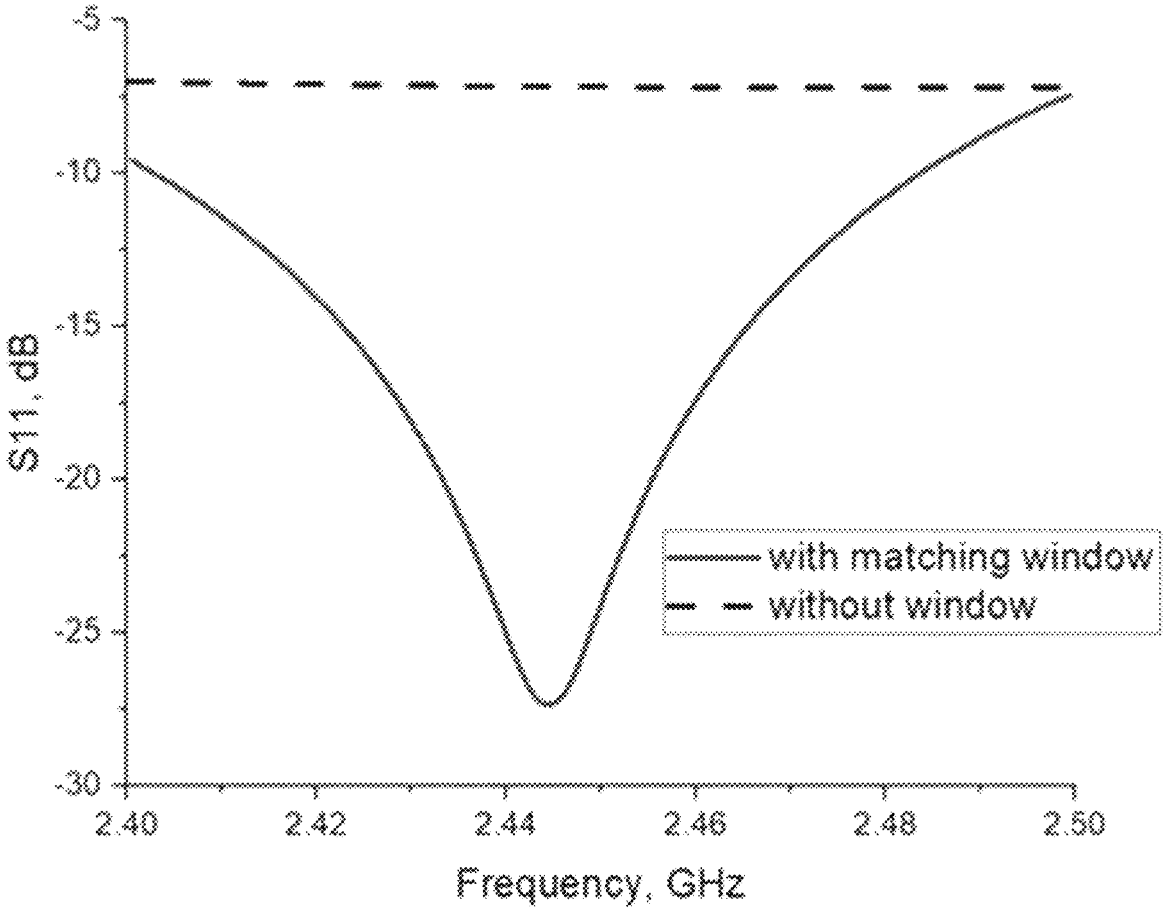
FIG. 7C is a graph of the power reflection coefficient as a function of operating frequency, according to an embodiment of the present disclosure.

FIG. 7C is a graph of the power reflection coefficient as a function of operating frequency, according to an embodiment of the present disclosure. FIG. 7C demonstrates the frequency dependence of the power reflections in the antennae from FIG. 7B. The graph demonstrates that the applicator 111 can be effectively matched by the introduction of the dielectric window and optimization of dielectric lens dimensions. FIG. 7C shows a comparison of the power reflection coefficient in a system having the matching dielectric window and a system without the matching dielectric window. The dimensions of the circular horn antenna 715, including radius and thickness of the aperture, length and angle of the horn, and radius of the lens 720, were optimized to have less than 1% of reflected power. A reflection coefficient ($S_{11}$ parameter of the Scattering matrix defined as $$S_{11} = 10\lg\frac{P_{ref}}{P_{forw}})$$

was used as the optimization criterion. The dimensions obtained during this optimization are presented in FIG. 7B, and $S_{11}$ frequency dependence in FIG. 7C.

Figure 8A:
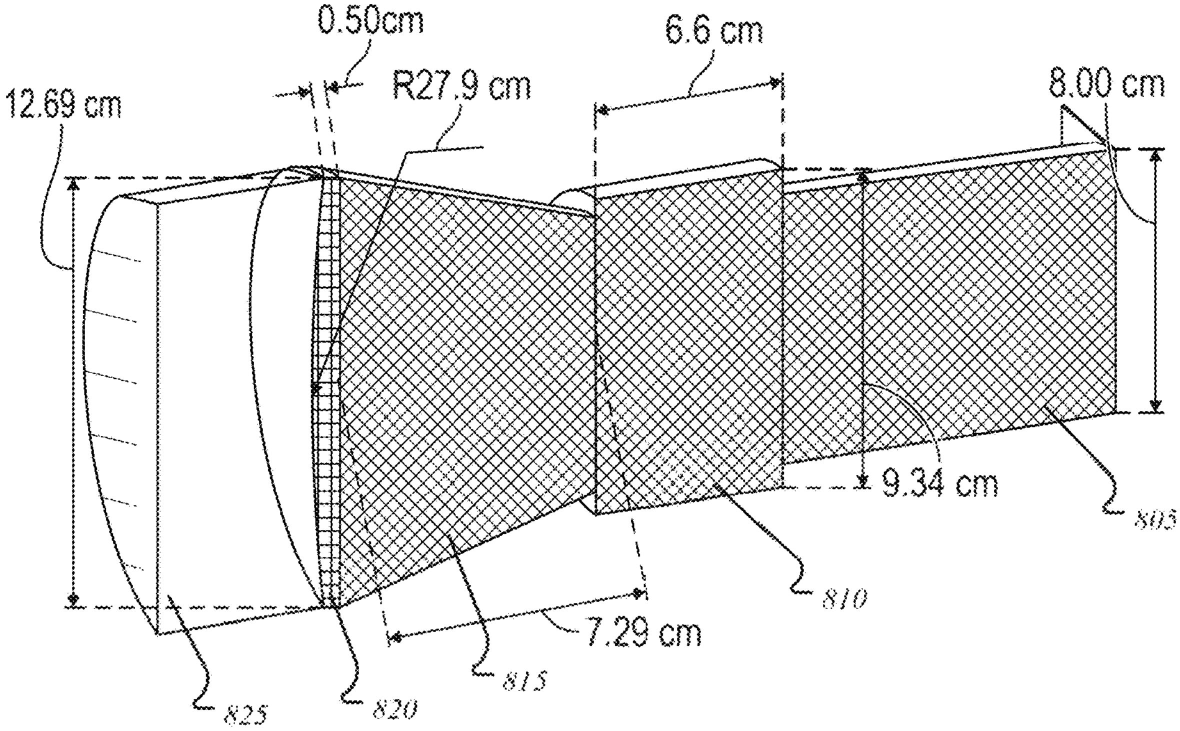
FIG. 8A is a schematic of the layout and optimal dimensions of the applicator with the matching waveguide, according to an embodiment of the present disclosure.

FIG. 7C shows that by having optimized dimensions (as in FIG. 7B), it is possible to reduce the reflections below −20 dB (1%). In particular, at the frequency of 2.45 GHz the reflections are −24 dB or 0.4%. The total reflection is a sum of reflections from liquid, lens and the window in different phases: $P\_reflected=P\_ref\_liquid*e^{i*\varphi\_liquid}+P\_ref\_lens*e^{i*\varphi\_lens}+P\_ref\_window*e^{i*\varphi\_window}$. The reflections from the liquid may be defined by the liquid's properties. The lens is designed to focus the EM wave. Then, in order to compensate this balance, another matching element, such as window (as in FIG. 7A), or a matching section, such as in FIG. 8A, is needed. By adjusting their dimensions (radius and thickness), the amplitude (P_ref_window) and phase (φ_window) can be adjusted, reflected from the matching window or the matching section to sum with the reflections from water (P_ref_liquid, φ_liquid) and lens (P_ref_lens, φ_lens) and negate them, i.e. P_reflected<−20 dB. If the window is removed, only the lens may compensate for the reflections from the liquid, which may not be enough (for example, due to unphysical dimensions) to obtain sufficient matching.

Due to the resonant nature of the matching section, the matching of less than −10 dB is observed within ±40 MHz bandwidth, and the matching of −20 dB can be achieved only within ±10 MHz around the operating frequency. The reflections at the matched frequency are −28 dB, which corresponds to about 0.16% of the input power.

FIG. 8A is a schematic of the layout and optimal dimensions of the applicator 111 with the matching waveguide 805, according to an embodiment of the present disclosure.

Figure 8B:
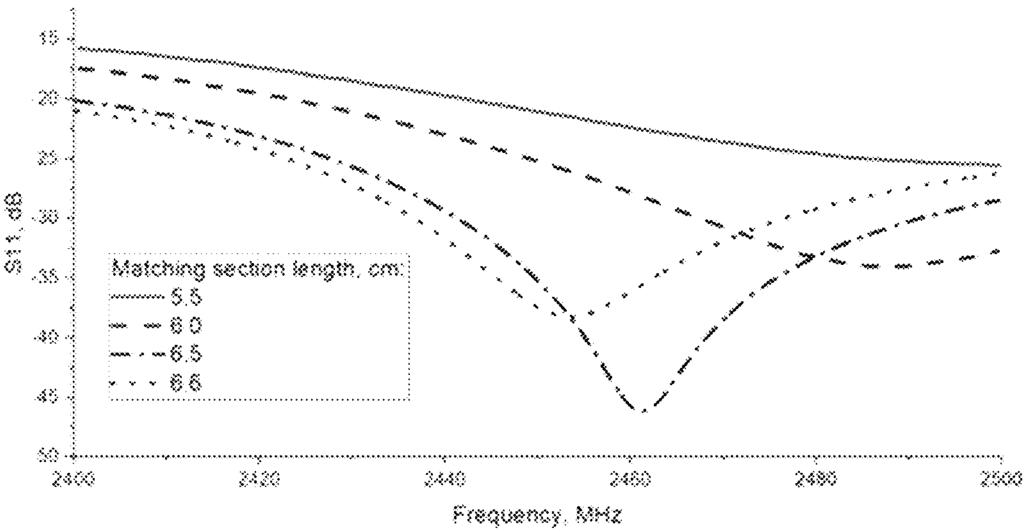
FIG. 8B is a graph of the reflection coefficient frequency dependence for different values of the matching section length, according to an embodiment of the present disclosure.

FIG. 8B is a graph of the reflection coefficient frequency dependence for different values of the matching section length, according to an embodiment of the present disclosure. The graph demonstrates that the frequency can be matched by adjusting the matching section length with a sensitivity of ~6.7 MHz/mm. In order to solve the aforementioned problem, the applicator 111 may be matched to a waveguide 805 with a tunable impedance to compensate for reflections from liquid media 825, a horn antenna 815, and a lens 820 as shown in FIG. 8A. In the design shown, the length and radius of the matching section waveguide plays a role similar to the matching window. Therefore, the frequency can be matched by adjusting either of these dimensions. For example, a telescopic matching section 810 can adjust the central frequency (those corresponding to minimal $S_{11}$) with a sensitivity of ~8 MHz/mm as shown in FIG. 8B. The optimal performance is observed with the dimensions shown in FIG. 8A and corresponds to $S_{11}$—=−38 dB (0.016% of reflected power), and the bandwidth with respect to the operating frequency is similar to those for the matching window 710 design.

Interaction of Two Horn Applicators Via a Water-Filled Vessel

Figure 9A:
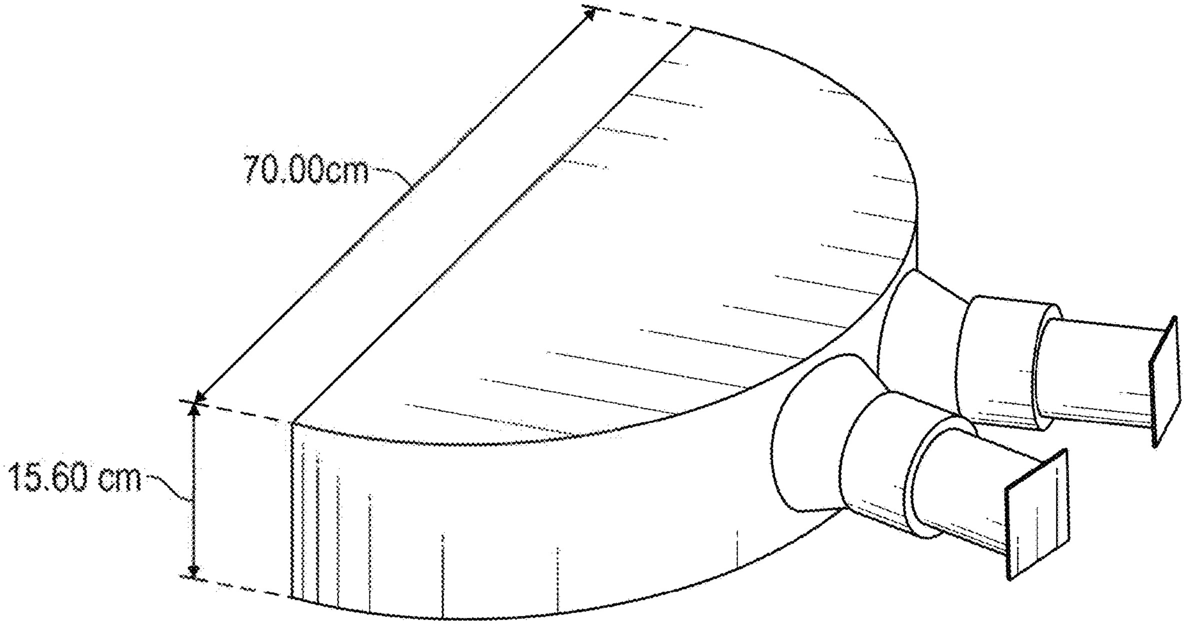
FIG. 9A is a simulation schematic of two horn-type applicators attached to a cylindrical water vessel with 23° angular distance in between, according to an embodiment of the present disclosure.

FIG. 9A is a simulation schematic of two horn-type applicators 111 attached to a cylindrical water vessel with 23° angular distance in between, according to an embodiment of the present disclosure.

Figure 9B:
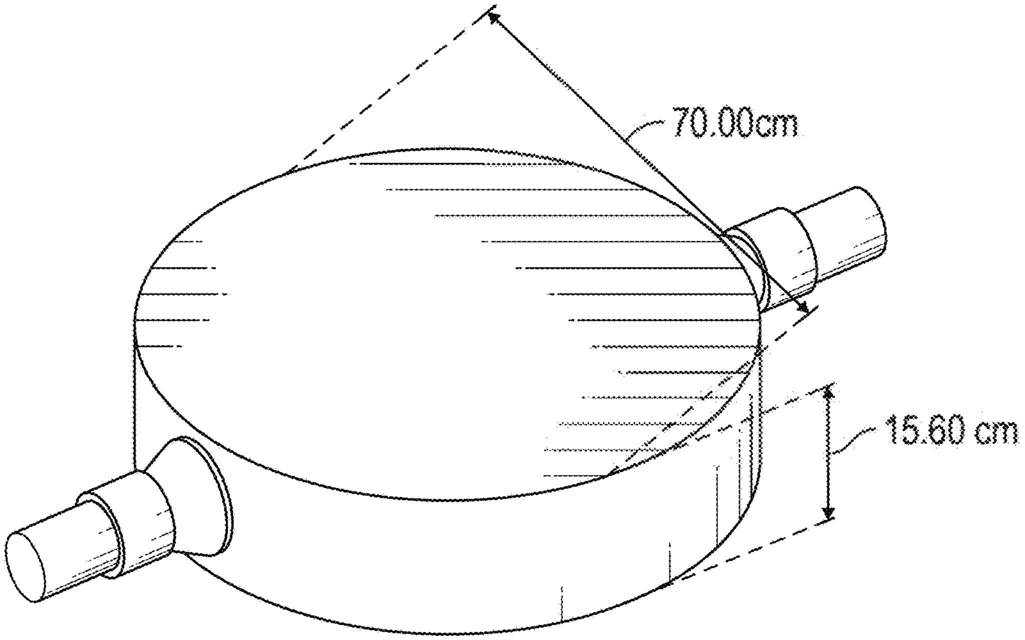
FIG. 9B is a simulation schematic of two horn-type applicators attached to a cylindrical water vessel with 180° angular distance in between, according to an embodiment of the present disclosure.

FIG. 9B is a simulation schematic of two horn-type applicators 111 attached to a cylindrical water vessel with 180° angular distance in between, according to an embodiment of the present disclosure. In an embodiment, the interaction of the designed horn antenna systems with each other can be estimated while contacting the same liquid media. In this case, a cylindrical water-filled vessel was considered having a radius of 35 cm and the height being equal to the diameter of the circular horn applicator 111 (1 cm margins were added to the each side) as shown in FIGS. 9A and 9B. The applicators 111 with waveguide matching sections were attached to the curved surface of the vessel. Two cases were considered and depicted: 1) the applicators 111 placed as close to each other as possible (with an angle between their axes of symmetry of 23°), so that the radiated power doesn't decay much in water, and 2) the applicators 111 are placed opposite to each other (with an angle of 180° between their axes of symmetry). In the latter case, the spatial separation is the largest, but due to the good directivity, the signal will be irradiating directly from one antenna to the other one. For other angular positions, the cross-talk will be in between these two cases.

In an embodiment, the simulations were performed similarly, but the performance criterion was that the $S_{21}$ parameter (or transmission coefficient) was defined as $$S_{21} = 10\lg\frac{P_2}{P_1}.$$

Here, $P_1$ is the RF power available in port 1 (circular waveguide of the first coupler), and $P_2$ is the power transmitted to port 2 (circular waveguide of the second coupler).

Figure 9C:
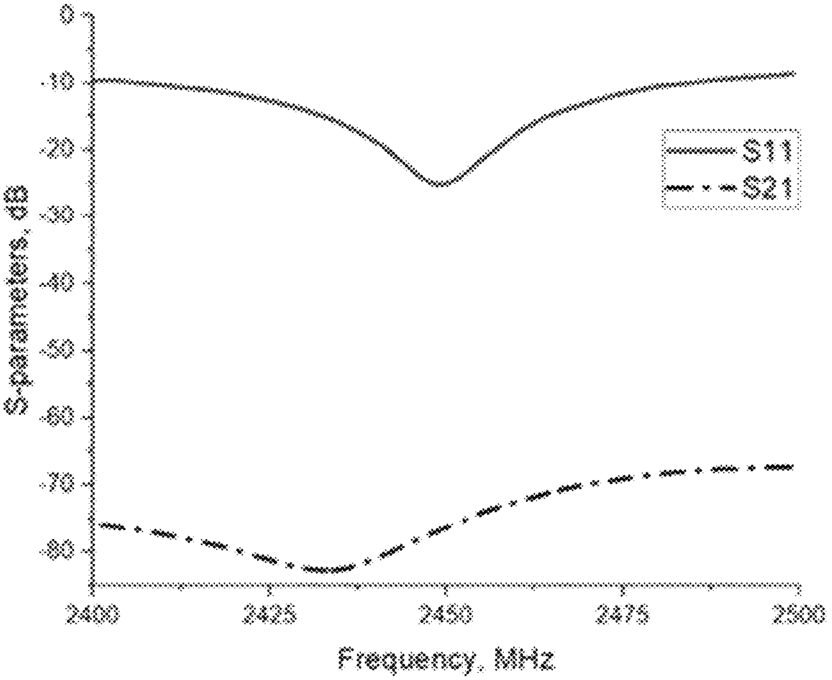
FIG. 9C is a graph of frequency dependence for the two applicators of FIG. 9A, according to an embodiment of the present disclosure.

FIG. 9C is a graph of frequency dependence for the two applicators 111 of FIG. 9A, according to an embodiment of the present disclosure.

Figure 9D:
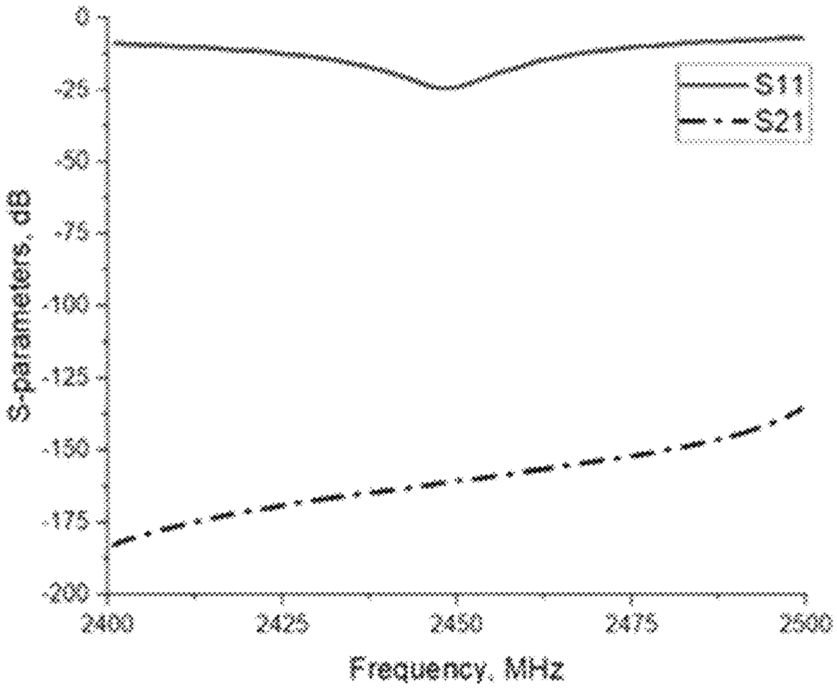
FIG. 9D is a graph of frequency dependence for the two applicators of FIG. 9B, according to an embodiment of the present disclosure.

FIG. 9D is a graph of frequency dependence for the two applicators 111 of FIG. 9B, according to an embodiment of the present disclosure. These graphs demonstrate the couplers are matched in a wide frequency range and that no cross-talk exists between two couplers, independent of their attachment location. The simulation results demonstrate that only less than $10^{-7}$ and $10^{-14}$ fraction of power reaches the other couplers in case of nearby (see FIG. 9A) and opposite (see FIG. 9B) position, respectively.

Figure 10A:
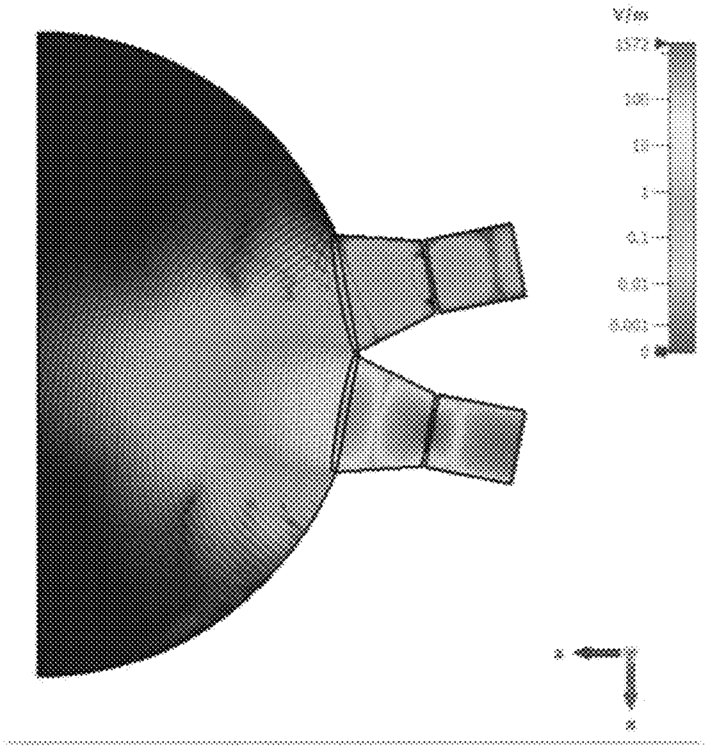
FIG. 10A is a simulation schematic of the instantaneous electric field map inside the vessel for two horn applicators arranged close to one another with a single horn applicator emitting, according to an embodiment of the present disclosure.

FIG. 10A is a simulation schematic of the instantaneous electric field map inside the vessel for two horn applicators 111 arranged close to one another with a single horn applicator 111 emitting, according to an embodiment of the present disclosure.

Figure 10B:
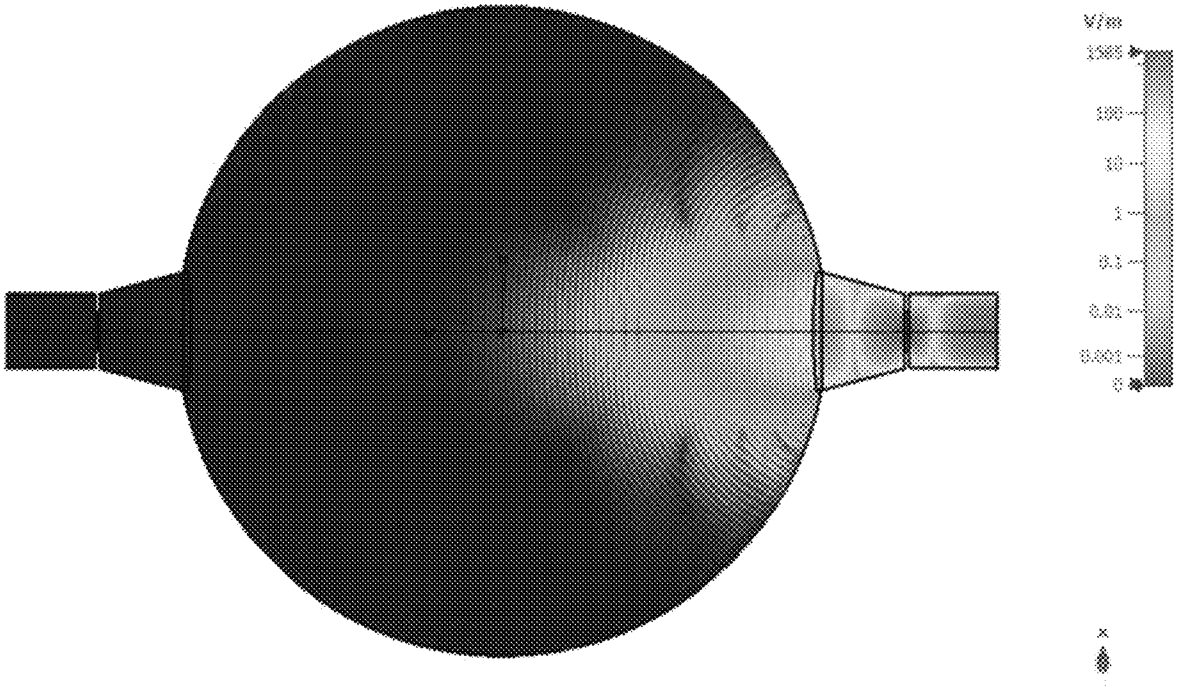
FIG. 10B is a simulation schematic of the instantaneous electric field map inside the vessel for two horn applicators arranged opposite to one another with a single horn applicator emitting, according to an embodiment of the present disclosure.

FIG. 10B is a simulation schematic of the instantaneous electric field map inside the vessel for two horn applicators 111 arranged opposite to one another with a single horn applicator 111 emitting, according to an embodiment of the present disclosure. FIGS. 10A and 10B show the electric field map of a two-applicator 111 system and the amount of field leakage. In an embodiment, the simulations demonstrate that cross-talk between two of the horn applicators 111 is negligible.

Figure 11A:
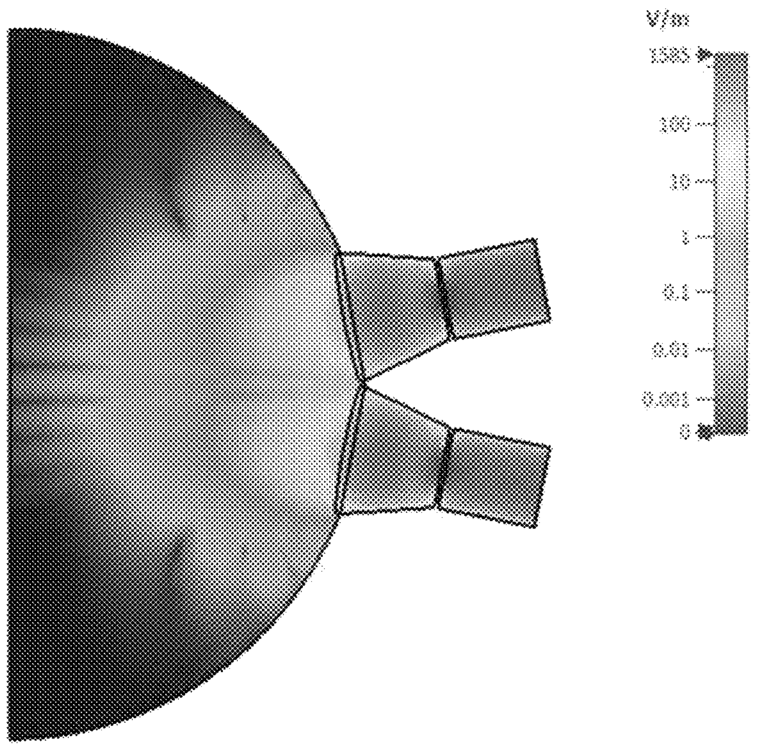
FIG. 11A is a simulation schematic of the instantaneous electric field map inside the vessel for two horn applicators arranged close to one another with both horn applicators emitting, according to an embodiment of the present disclosure.

FIG. 11A is a simulation schematic of the instantaneous electric field map inside the vessel for two horn applicators 111 arranged close to one another with both horn applicators 111 emitting, according to an embodiment of the present disclosure.

Figure 11B:
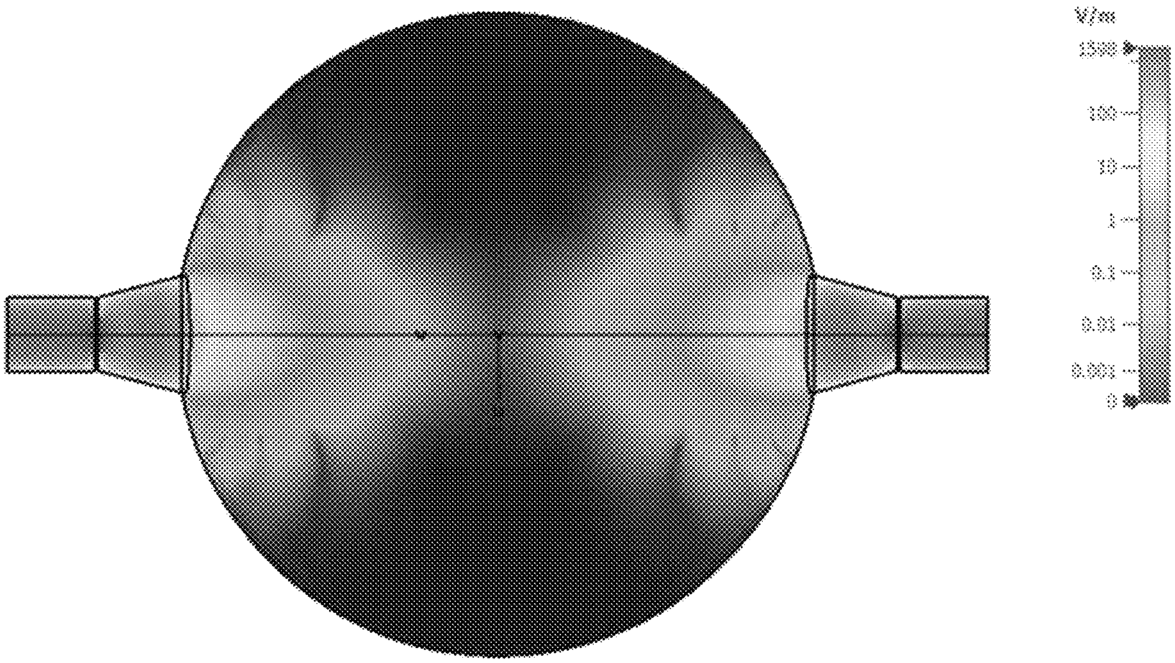
FIG. 11B is a simulation schematic of the instantaneous electric field map inside the vessel for two horn applicators arranged opposite one another with both horn applicators emitting, according to an embodiment of the present disclosure.

FIG. 11B is a simulation schematic of the instantaneous electric field map inside the vessel for two horn applicators 111 arranged opposite one another with both horn applicators 111 emitting, according to an embodiment of the present disclosure. It is important to estimate the interaction of the signals from the two antennas excited simultaneously. In an embodiment, the complex amplitude (maximum field amplitude in the given point at any given time) of the resulting field presented in FIGS. 11A and 11B shows that the signals do not interfere. It is important to emphasize that the signals quickly attenuate in water.

Temperature Dependence

Table 2 has been derived from the FIG. 2 of Oree et al. *Microwave complex permittivity of hot compressed water in equilibrium with its vapor.* 2017. *IEEE Radio and Antenna Days of the Indian Ocean*, September 2017, and it demonstrates the dependence of the dielectric permittivity parameters of water measured at different temperature and pressure conditions at a frequency of 2.42 GHz. Going forward, when referring to the temperature, it is implied that the corresponding pressure value is obtained from said table. It is also assumed that water is in equilibrium with its vapor.

TABLE 2

Real and imginary values of water permittivty measured at 2.42 GHz for different temperatures and pressures.

| T, ° C. | P, MPa | ε' | ε" | tan (δ) |
|---|---|---|---|---|
| 21.5 | | 78.6 | 10.8 | 0.138 |
| 50.0 | | 69.2 | 5.3 | 0.076 |
| 79.0 | | 60.1 | 3.2 | 0.053 |
| 94.0 | | 56.3 | 2.5 | 0.045 |
| 110.0 | 0.14 | 52.2 | 2.1 | 0.040 |
| 128.5 | 0.25 | 48.1 | 1.9 | 0.039 |
| 147.5 | 0.44 | 43.4 | 1.6 | 0.037 |
| 168.5 | 0.77 | 39.0 | 1.5 | 0.038 |
| 188.0 | 1.2 | 35.5 | 1.45 | 0.041 |
| 219.5 | 2.32 | 30.5 | 1.4 | 0.046 |
| 238.0 | 3.3 | 27.0 | 1.4 | 0.052 |
| 259.0 | 4.6 | 24.3 | 1.45 | 0.059 |
| 280.0 | 6.5 | 21.1 | 1.45 | 0.068 |

Figure 12A:
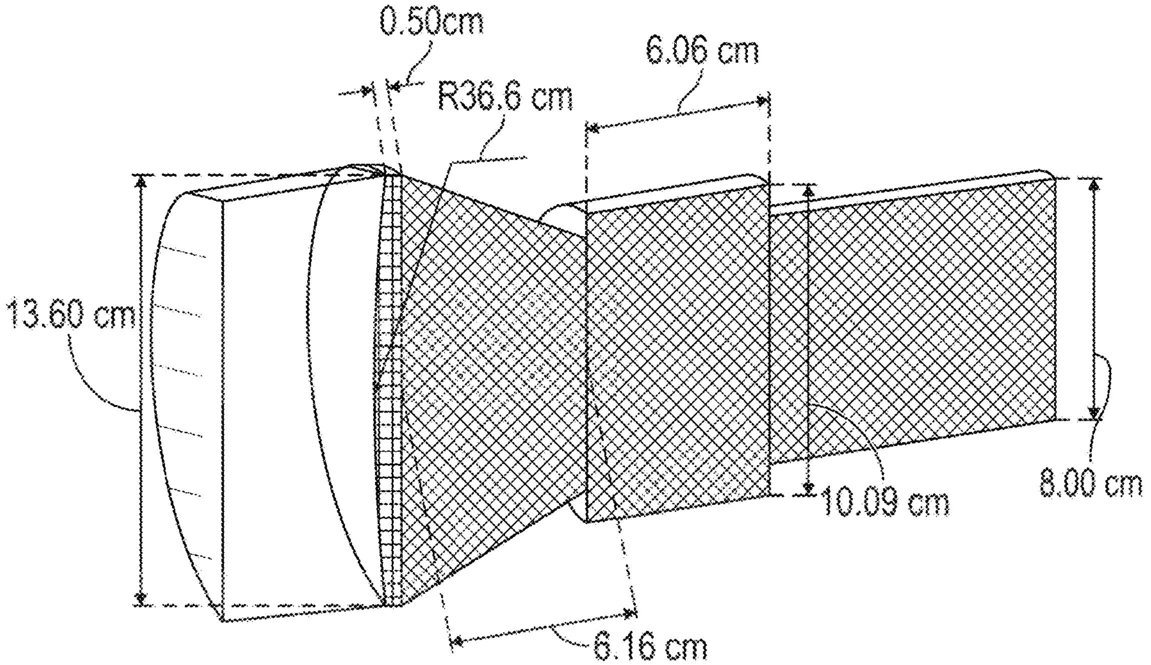
FIG. 12A is a schematic of the optimal dimensions of the applicator for the water properties at 130° C., according to an embodiment of the present disclosure.

FIG. 12A is a schematic of the optimal dimensions of the applicator 111 for the water properties at 130° C., according to an embodiment of the present disclosure.

Figure 12B:
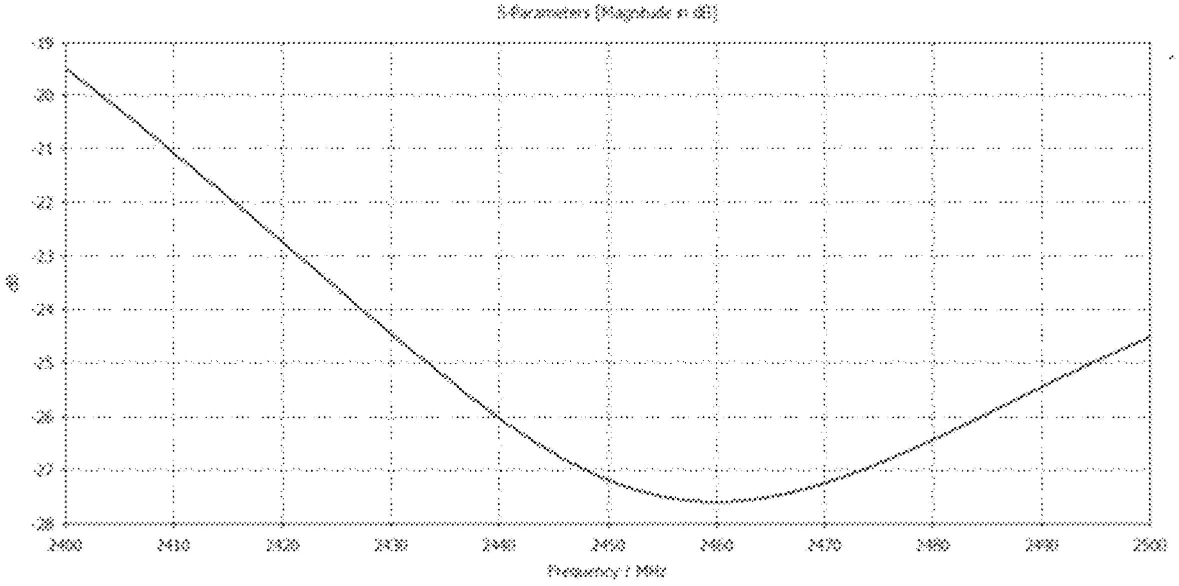
FIG. 12B is a graph of the frequency dependence for the applicator in FIG. 12A, according to an embodiment of the present disclosure.

FIG. 12B is a graph of the frequency dependence for the applicator 111 in FIG. 12A, according to an embodiment of the present disclosure. In an embodiment, the real part of the permittivity of water varies from 20 to 80 and serves as the primary parameter that determines matching properties of the applicator 111 (coupler). Therefore, the coupler dimensions (see FIG. 12A) were recalculated for water at 130° C. (ε=48) to become the middle point, so that the frequency detuning of the system due to change in the water properties is roughly equal for both 20° C. and 300° C.

Figure 13A:
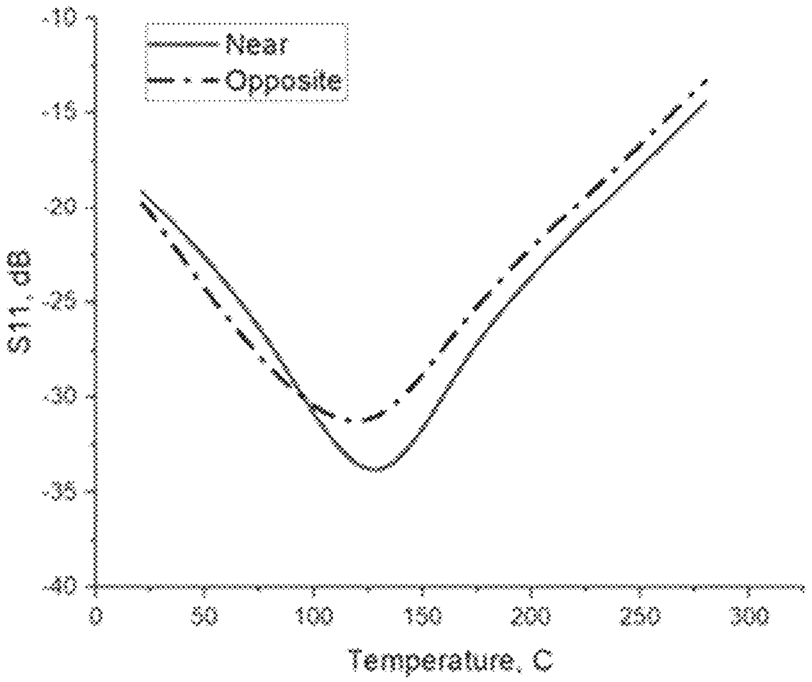
FIG. 13A is a graph of reflection coefficient dependencies of two of the applicators attached close (solid) and opposite (dot) to each other as a function of water properties at different temperatures, according to an embodiment of the present disclosure.

FIG. 13A is a graph of reflection coefficient dependencies of two of the applicators 111 attached close (solid) and opposite (dot) to each other as a function of water properties at different temperatures, according to an embodiment of the present disclosure.

Figure 13B:
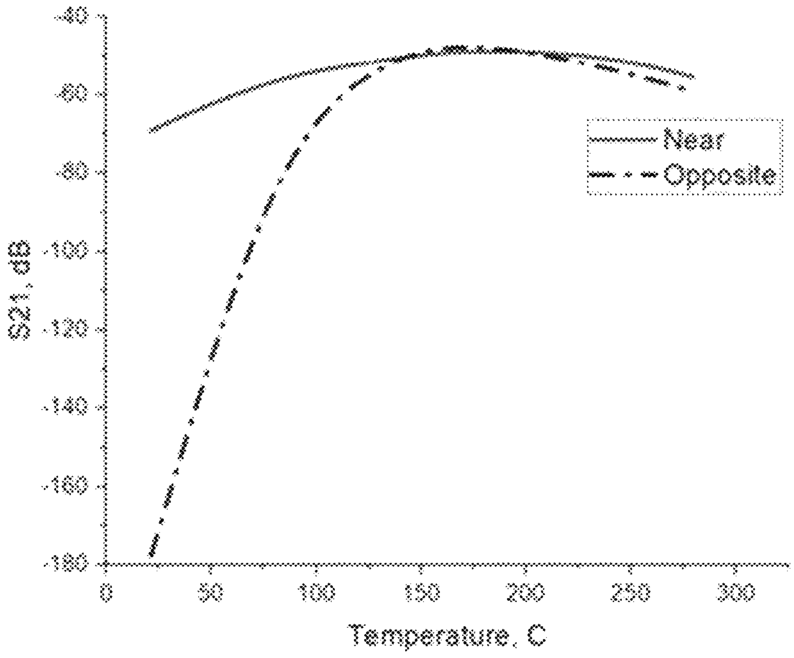
FIG. 13B is a graph of transmission coefficient dependencies of two of the applicators attached close (solid) and opposite (dot) to each other as a function of water properties at different temperatures, according to an embodiment of the present disclosure.

FIG. 13B is a graph of transmission coefficient dependencies of two of the applicators 111 attached close (solid) and opposite (dot) to each other as a function of water properties at different temperatures, according to an embodiment of the present disclosure. In an embodiment, these graphs demonstrate that the antennas are well matched for the whole range of water temperatures, and that there is practically no cross-talk between two applicators 111 in this range. RF simulations for the model presented in FIGS. 9A and 9B are performed for the couplers with the dimensions optimized for water at 130° C., and demonstrate that both reflections ($S_{11}$) and cross-talk between two couplers ($S_{21}$) remain within the acceptable range (<−15 dB and <−50 dB, respectively) for both nearby and opposite locations.

Figure 14A:
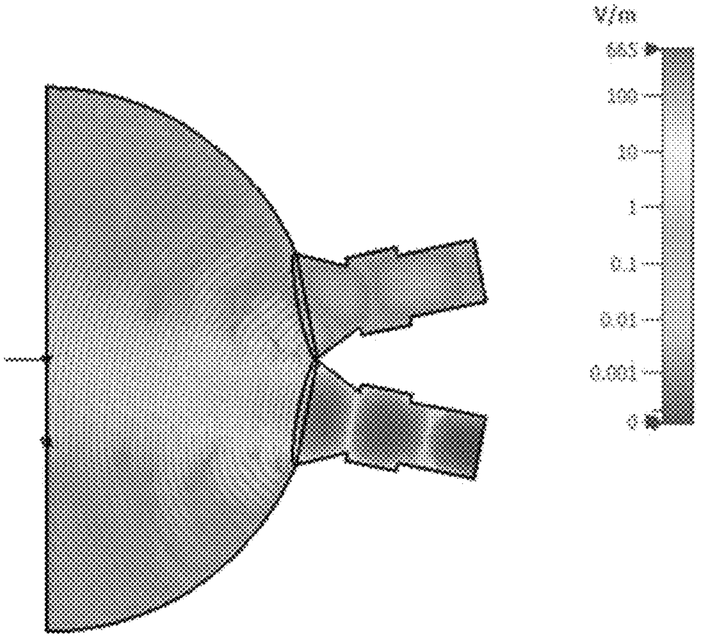
FIG. 14A is a simulation schematic of the instantaneous electric field map inside the vessel for two horn applicators arranged close to one another with one horn applicator emitting, according to an embodiment of the present disclosure.

FIG. 14A is a simulation schematic of the instantaneous electric field map inside the vessel for two horn applicators 111 arranged close to one another with one horn applicator 111 emitting, according to an embodiment of the present disclosure.

Figure 14B:
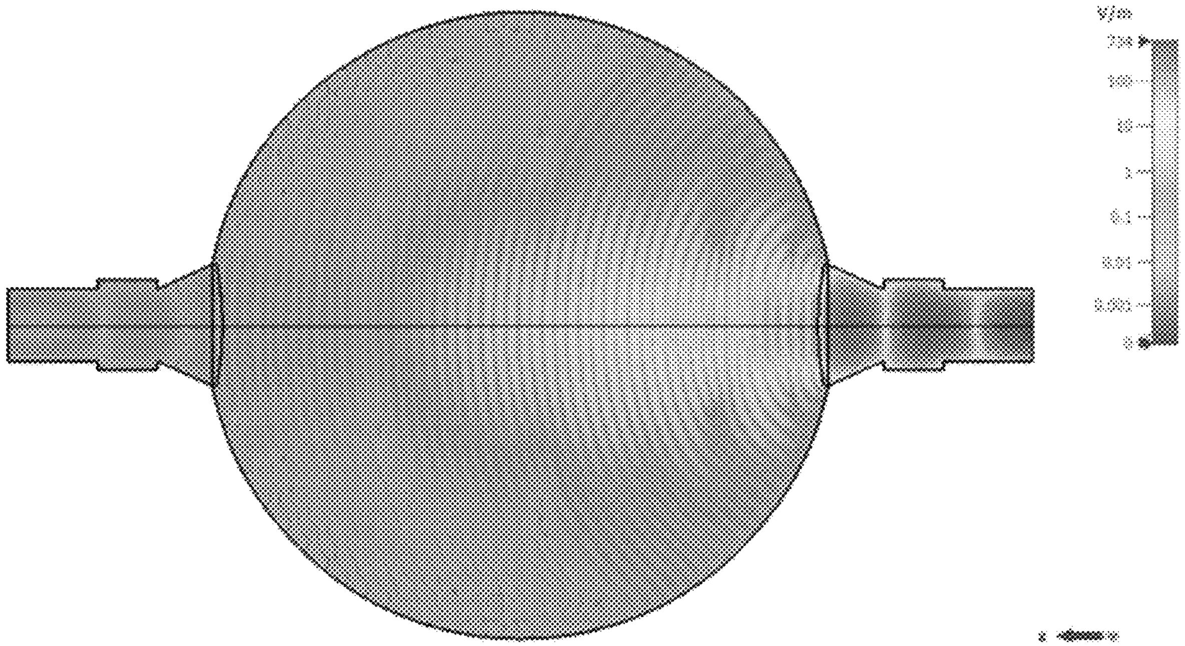
FIG. 14B is a simulation schematic of the instantaneous electric field map inside the vessel for two horn applicators arranged opposite one another with one horn applicator emitting, according to an embodiment of the present disclosure.

FIG. 14B is a simulation schematic of the instantaneous electric field map inside the vessel for two horn applicators 111 arranged opposite one another with one horn applicator 111 emitting, according to an embodiment of the present disclosure. In an embodiment, these simulations demonstrate that cross-talk between two couplers in negligible even when the field dissipation in water is lower than at room temperature. Similar to the results obtained for the room-temperature unpressurized water, FIGS. 14A and 14B show the negligible field leak from one applicator 111 to another if the system is re-optimized for water with variable parameters in the temperature range from 20° C. to 280° C. when water is in equilibrium with its vapor and pressure in the system approaches up to 65 bar. The apparatus' 100 energy efficiency, defined as k=1−|S1,1|−|S2,1| is above 98% for all cases utilizing the optimized design for horn antennas/dielectrics/etc. The apparatus 100 allows a very efficient energy transfer to a large load from multiple generators operating independently from each other.

Mechanical Properties of the System

Figure 15A:
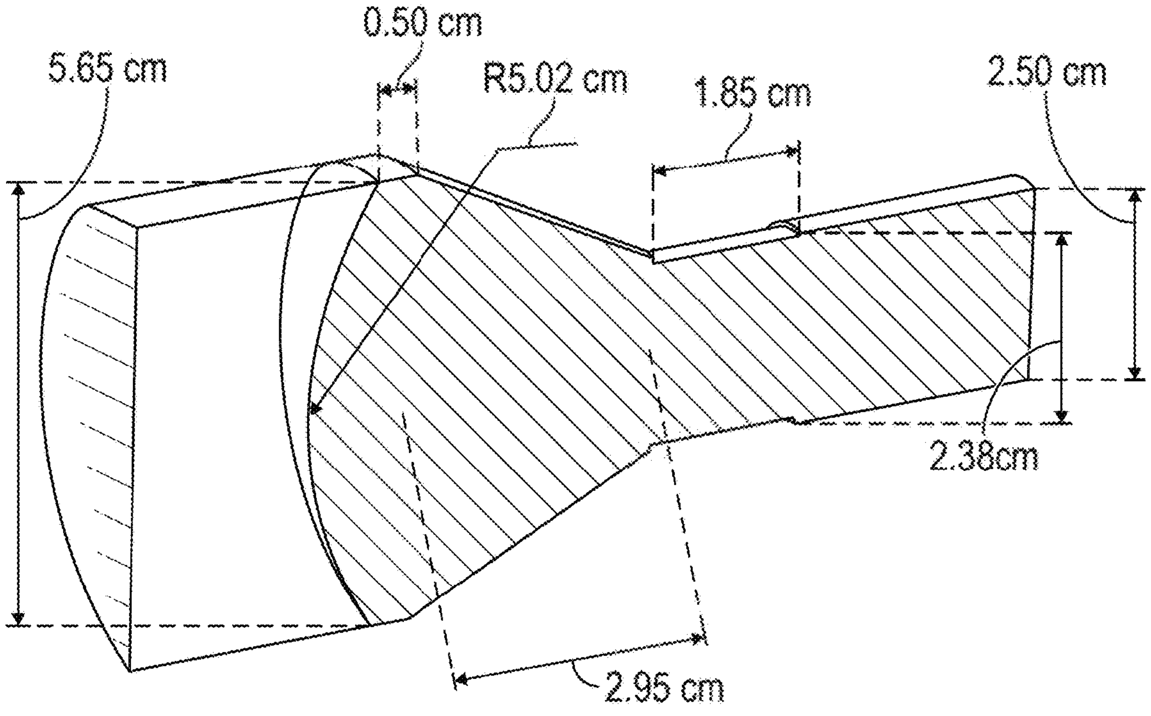
FIG. 15A is a schematic of the applicator designed with enhanced structural rigidity by filling with a dielectric, according to an embodiment of the present disclosure.

FIG. 15A is a schematic of the applicator 111 designed with enhanced structural rigidity by filling portions of the applicator 111 with a dielectric, according to an embodiment of the present disclosure.

Figure 15B:
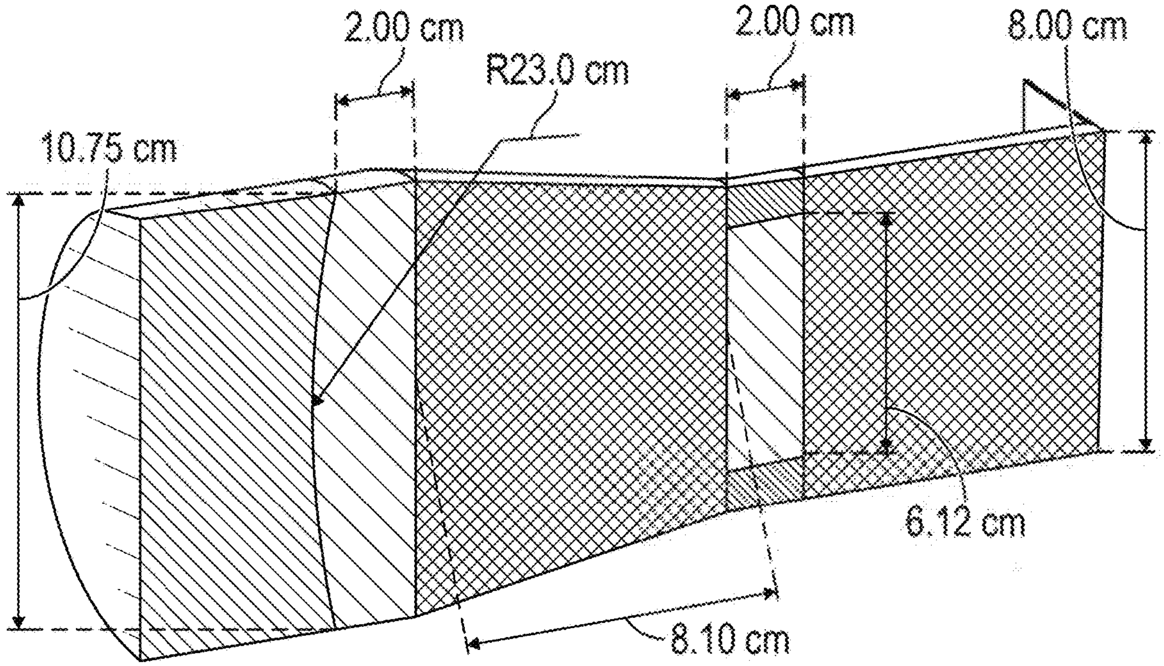
FIG. 15B is a schematic of the applicator designed with enhanced structural rigidity by filling with a dielectric in discrete sections, according to an embodiment of the present disclosure.

FIG. 15B is a schematic of the applicator 111 designed with enhanced structural rigidity by filling portions of the applicator 111 with a dielectric in discrete sections, according to an embodiment of the present disclosure. The mechanical pressure on the dielectric lens produced by the volume of liquid can be accounted for, which can be substantial and may result in water leakage into the applicator 111 or even break the lens. In an embodiment, to counter the pressure, two solutions are described: 1) completely fill the applicator 111 with dielectric, and 2) make the alumina slab thicker (at least 2 cm). In the first case, the transition section matches the coupler as shown in FIG. 15A, and in the second case, this function is fulfilled by the thicker window as shown in FIG. 15B. The remaining dimensions were optimized to match the antenna to water medium (with room temperature). In these simulations, the properties of 96%-pure alumina were used as a conservative approach, with the parameters listed in Table 1.

Figure 15C:
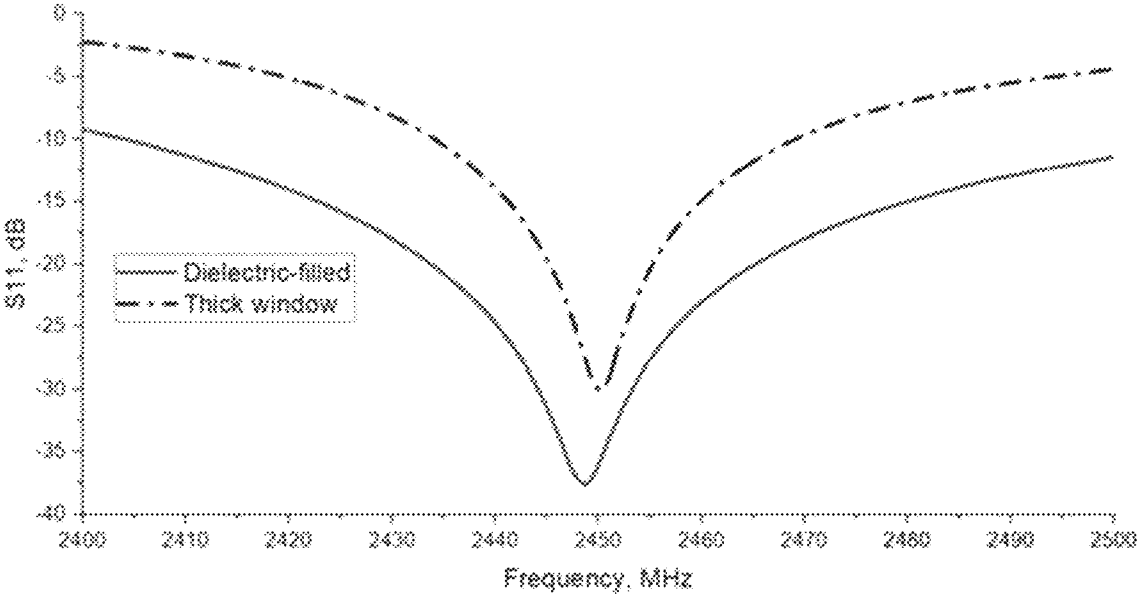
FIG. 15C is a graph of the comparison of the reflection parameter frequency dependence in dielectric-filled and thick window applicators, according to an embodiment of the present disclosure.

FIG. 15C is a graph of a comparison of the reflection parameter frequency dependence in dielectric-filled and thick window applicators 111, according to an embodiment of the present disclosure. In an embodiment, for both models shown in FIGS. 15A and 15B, the frequency dependence of reflection parameter $S_{11}$ is presented in FIG. 15C, and it demonstrates that good (<−30 dB) matching is possible in both of these cases, but the dielectric antenna seems to be more broadband (30 MHz at −20 dB level vs 10 MHz for a thick window/lens antenna).

Although both design options are feasible in terms of RF power reflection optimization, it is important to consider the phenomena of RF power losses in each applicator 111 design to make sure that they are reasonable and can be properly handled. There are two mechanisms of RF losses in this case: Eddy current losses on the copper parts due to magnetic fields, and losses inside the dielectric due to electric fields. The losses are proportional to the volume of dielectric medium. Table 3 summarizes the loss budget for both options and demonstrates that power losses (both dialectic and copper) in dielectric-filled antenna are twice as much as those for the thick-lens.

TABLE 3

RF losses in optimized applicator antennas

| Design | Dielectric-filled | Thick lenses |
|---|---|---|
| Input power | 10 kW | |
| Losses in alumina | 157 W | 75 W (lens only) |
| Losses on opper surface | 57 W | 22 W |
| Reflected power | 3 W | 10 W |
| Peak E-field strength | 210 kV/m | 176 kV/m |

For conservative estimation of losses, the less expensive 96% alumina (Table 1) was used and the results presented in Table 3.

Figure 16A:
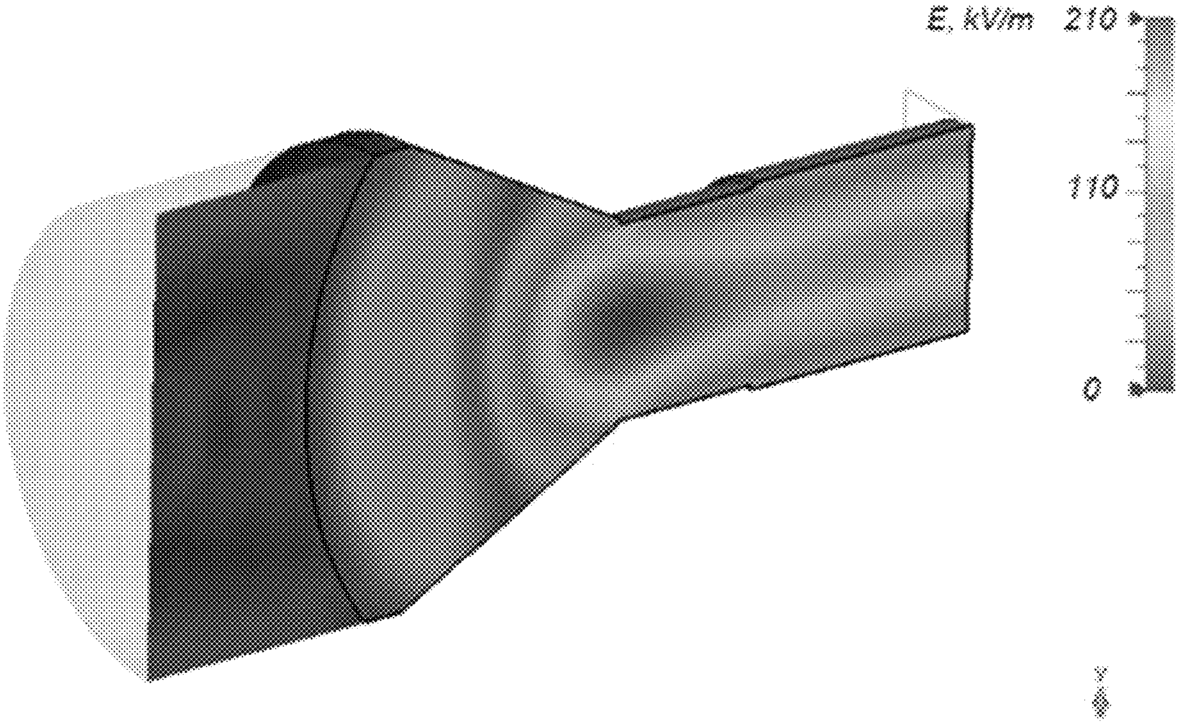
FIG. 16A is a simulation schematic of the distribution of complex electric field distribution in dielectric-filled applicators at 10 kW of input power, according to an embodiment of the present disclosure.

FIG. 16A is a simulation schematic of the distribution of complex electric field distribution in dielectric-filled applicators 111 at 10 kW of input power, according to an embodiment of the present disclosure.

Figure 16B:
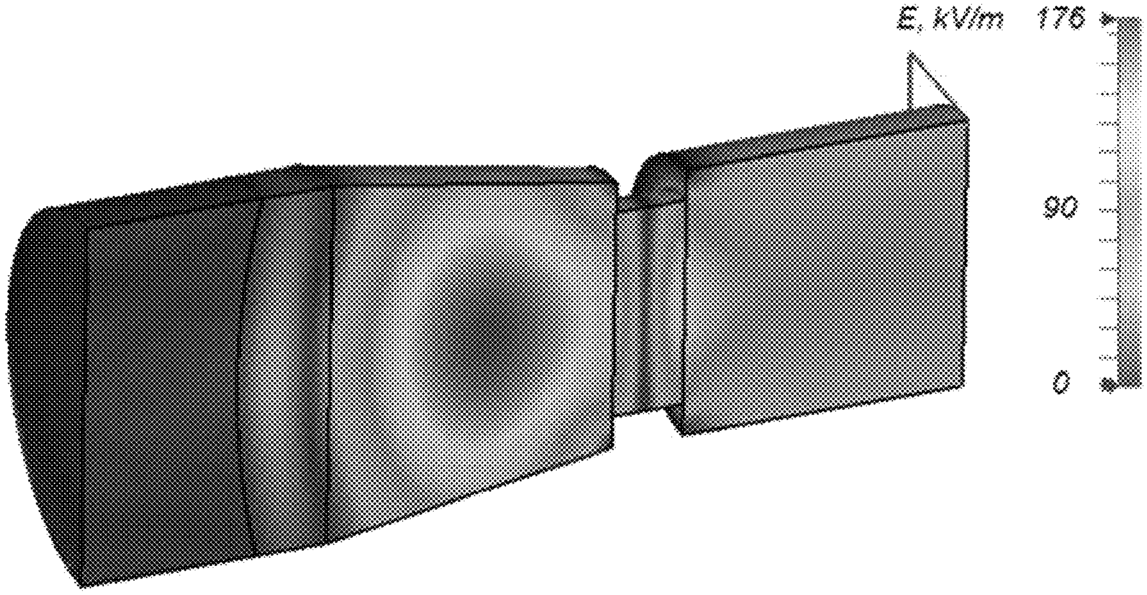
FIG. 16B is a simulation schematic of the distribution of complex electric field distribution in thick-lens applicators at 10 kW of input power, according to an embodiment of the present disclosure.

FIG. 16B is a simulation schematic of the distribution of complex electric field distribution in thick-lens applicators 111 at 10 kW of input power, according to an embodiment of the present disclosure. It is important to ensure that peak electric fields in the applicators 111 are small, so that no discharge can occur. The electric strength of air is 30 kV/cm=3 000 kV/m, and that for alumina is approximately 10 kV/mm=10 000 kV/m and grows as $\sim f^{1/2}$ as the frequency increases. The simulated peak values in E-field for 10 kW, presented in FIGS. 16A and 16B, demonstrate that in both cases we are far away from the breakdown.

Frequency Sensitivity

Figure 17:
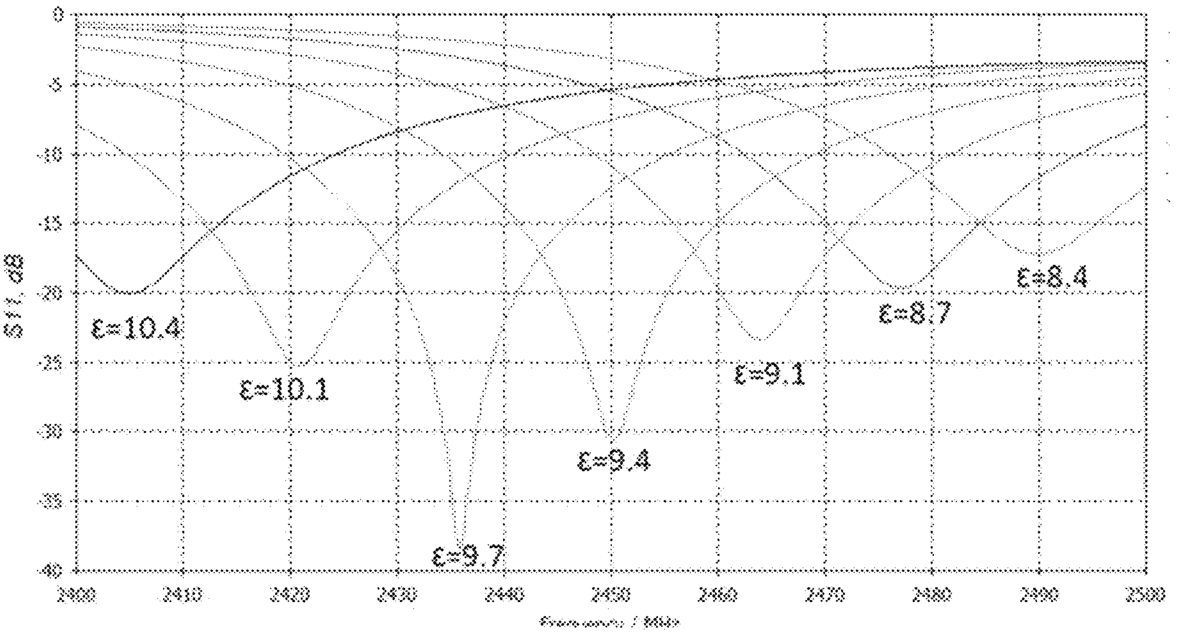
FIG. 17 is a graph of the frequency dependence of the reflections in the thick-lens applicator for different permittivity values of the alumina, according to an embodiment of the present disclosure.

FIG. 17 is a graph of the frequency dependence of the reflections in the thick-lens applicator 111 for different permittivity values of the alumina, according to an embodiment of the present disclosure. In an embodiment, the stability of the coupler performance relative to the parameters of the dielectric material with the variation in parameters can be estimated. For the estimation, the permittivity and loss tangent of alumina were varied by ±10% and the simulations demonstrate that such variations result in the optimal frequency shift by ±40 MHz (−40 MHz/[unit of permittivity]). Therefore, the variance in dielectric parameters can either be controlled by frequency adjustment (per each coupler) or by a mechanical tuning mechanism. Because these operations are independent, an automatic control can be easily implemented.

Figure 18:
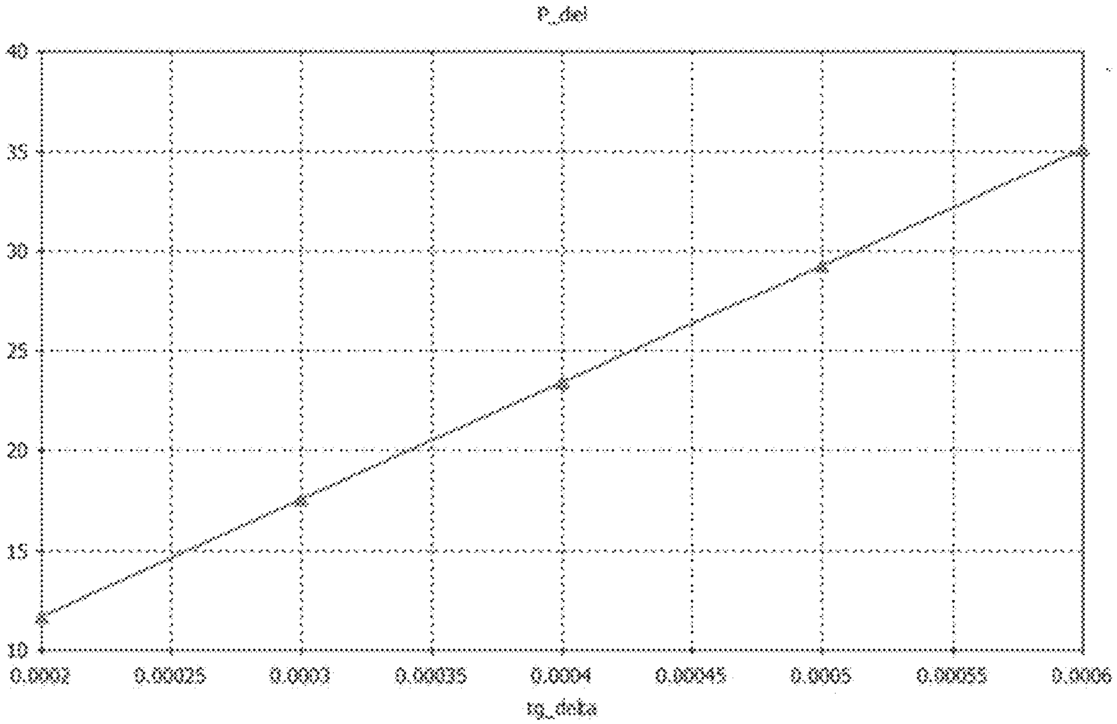
FIG. 18 is a graph of the RF losses in the dielectric lens as a function of loss tangent of the alumina, according to an embodiment of the present disclosure.

FIG. 18 is a graph of the RF losses in the dielectric lens as a function of loss tangent of the alumina, according to an embodiment of the present disclosure. In an embodiment, the loss tangent variation can only cause the variation in RF losses inside the alumina, since it does not affect any other RF properties in terms of EM-wave propagation. The simulation results shown demonstrate a linear dependence of the loss power from the loss tangent.

CONCLUSIONS

In summary, the results of numerical experiments have demonstrated that the principle of spatial separation does work and can allow combining of multiple microwave generators for irradiating a large load, such as greater than 50 L, or greater than 100 L, without interference between radiating elements (i.e. applicators 111) and with effectively controllable independent tuning of each of said microwave generators. Methods and devices for mixing/rotation/etc. can be added to the apparatus 100 described in the Examples 1 to 7 or similar, and can provide homogeneous heating/processing of said load.

Commercially available microwave power transistors of 0.5 kW at 2.45 GHz and 1.5 kW at 915 MHz are rather inexpensive, making an industrial-scale reactor with a number of such transistors economically viable and efficient in aspects of the pharmaceutical field and beyond because such aspects have been shown in a small-scale process previously while the linear scale up of the microwave processing has also been demonstrated.

Examples of the embodiments, together with the results from the simulations and experiments of the embodiments, have proven that the disclosed apparatus 100 allows implementation into practice for an industrial-scale process for manufacturing of medicine and drug components, wherein the whole process or a step of the process is performed with use of microwave radiation. Ultimately, the manufacturing, which exploits processing based on invented microwave reactors, can deliver medicine and drug components in an incredibly timely and efficient manner.

In the preceding description, specific details have been set forth, such as a particular geometry of a processing system and descriptions of various components and processes used therein. It should be understood, however, that techniques herein may be practiced in other embodiments that depart from these specific details, and that such details are for purposes of explanation and not limitation. Embodiments disclosed herein have been described with reference to the accompanying drawings. Similarly, for purposes of explanation, specific numbers, materials, and configurations have been set forth in order to provide a thorough understanding. Nevertheless, embodiments may be practiced without such specific details. Components having substantially the same functional constructions are denoted by like reference characters, and thus any redundant descriptions may be omitted.

Various techniques have been described as multiple discrete operations to assist in understanding the various embodiments. The order of description should not be construed as to imply that these operations are necessarily order dependent. Indeed, these operations need not be performed in the order of presentation. Operations described may be performed in a different order than specifically described unless expressly indicated otherwise. Various additional operations may be performed and/or described operations may be omitted.

Those skilled in the art will also understand that there can be many variations made to the operations of the techniques explained above while still achieving the same objectives of the disclosure. Such variations are intended to be covered by the scope of this disclosure. As such, the foregoing descriptions of embodiments are not intended to be limiting. Rather, any limitations to embodiments are presented in the following claims.

Embodiments of the present disclosure may also be as set forth in the following parentheticals.

(1) An apparatus for large batch chemical reactions using microwave energy, comprising: a chamber defined by an outer wall; a vessel disposed inside the chamber, the vessel defined by an inner wall, the inner wall being separated from the outer wall by a gap, the vessel configured to receive and hold a load; and a first applicator and a second applicator configured to emit the microwave energy at the load, wherein points at which microwave energy emitted by the first applicator and the second applicator enter the load are spaced at a distance from each other that is longer than a penetration depth of the microwave energy into the load such that no electromagnetic intercoupling occurs between the first applicator and the second applicator upon emission of the microwave energy.

(2) The apparatus of (1), further comprising: a first microwave window formed in the inner wall at a position corresponding to a location of the first applicator; and a second microwave window formed in the inner wall at a position corresponding to a location of the second applicator, wherein a material of the first microwave window and the second microwave window is at least partially transparent to microwave energy and chemically resistant to reagents in the load, the first applicator being configured to emit the microwave energy through the first microwave window into the vessel.

(3) The apparatus of either (1) or (2), wherein the first applicator includes a waveguide at a first end of the first applicator and a horn antenna at a second end of the first applicator, the second end of the first applicator being disposed proximal to the first microwave window and the first end of the first applicator being disposed distal to the first microwave window, the waveguide configured to receive the microwave energy and direct the microwave energy through the waveguide into the horn antenna.

(4) The apparatus of any one of (1) to (3), wherein when the first applicator and the second applicator are disposed inside the vessel, a distance between locations of the first applicator and the second applicator within the vessel is longer than a longest penetration depth of the microwave energy into the load among all steps of a chemical process cycle that include emitting the microwave energy at the load by the first applicator and the second applicator, and when the first applicator and the second applicator are disposed outside the vessel, a distance between the first microwave window and the second microwave window is longer than a longest penetration depth of the microwave energy into the load among all the steps of the chemical process cycle that include emitting the microwave energy at the load by the first applicator and the second applicator.

(5) The apparatus of any one of (1) to (4), wherein when the first applicator and the second applicator are disposed inside the vessel, a distance between locations of the first applicator and the second applicator within the vessel is 1.5 times longer than a longest penetration depth of the microwave energy into the load among all steps of a chemical process cycle that include emitting the microwave energy at the load by the first applicator and the second applicator, and when the first applicator and the second applicator are disposed outside the vessel, a distance between the first microwave window and the second microwave window is 1.5 times longer than a longest penetration depth of the microwave energy into the load among all the steps of the chemical process cycle that include emitting the microwave energy at the load by the first applicator and the second applicator.

(6) The apparatus of any one of (1) to (5), wherein when the first applicator and the second applicator are disposed inside the vessel, a distance between locations of the first applicator and the second applicator within the vessel is 2 times longer than a longest penetration depth of the microwave energy into the load among all steps of a chemical process cycle that include emitting the microwave energy at the load by the first applicator and the second applicator, and when the first applicator and the second applicator are disposed outside the vessel, a distance between the first microwave window and the second microwave window is 2 times longer than a longest penetration depth of the microwave energy into the load among all the steps of the chemical process cycle that include emitting the microwave energy at the load by the first applicator and the second applicator.

(7) The apparatus of any one of (1) to (6), wherein the first applicator and the second applicator each occupy a corresponding subspace in the gap between the outer wall of the chamber and the inner wall of the vessel.

(8) The apparatus of any one of (1) to (7), further comprising a first microwave generator configured to generate the microwave energy having a first frequency at a first power and transmit the microwave energy to the first applicator, the first microwave generator being electromagnetically connected to the first applicator.

(9) The apparatus of (8), further comprising: a first microwave window formed in the inner wall at a position corresponding to a location of the first applicator; and a second microwave window formed in the inner wall at a position corresponding to a location of the second applicator, wherein a material of the first microwave window and the second microwave window is chemically resistant to reagents in the load, the first applicator being disposed inside the vessel and configured to receive the microwave energy from the first microwave generator through the first microwave window.

(10) The apparatus of either (8) or (9), wherein the first microwave generator is located outside the chamber and connected to the first applicator, which is located in the gap.

(11) The apparatus of any one of (1) to (10), wherein the vessel is pressurized and the chamber is pressurized.

(12) The apparatus of any one of (1) to (11), further comprising a mixing device, the mixing device configured to homogenize reagents in the load.

(13) The apparatus of any one of (1) to (12), wherein the load comprises a liquid-based reactive medium capable of absorbing microwave energy, and the penetration depth of the microwave energy is a longest penetration depth of the microwave energy into the reactive medium among all steps of a chemical process cycle that include emitting the microwave energy at the reactive medium.

(14) The apparatus of any one of (1) to (13), wherein a volume of the medium in the vessel is equal to or more than 40 L, or equal to or more than 50 L, or equal to or more than 60 L, or equal to or more than 75 L, equal to or more than 90 L, or equal to or more than 100 L.

(15) The apparatus of any one of (1) to (14), further comprising separate first and second microwave shielding areas located in the gap and configured to reflect microwave energy, the first microwave shielding area enclosing the first applicator located in the gap and the second microwave shielding area enclosing the second applicator located in the gap, such that the first applicator in the gap is shielded from the second applicator in the gap and the second applicator in the gap is shielded from the first applicator in the gap.

(16) The apparatus of (15), wherein a distance between the first applicator in the gap and a wall of the first microwave shielding area is fixed and equal to length A that is based on a wavelength X of microwave radiation in a space surrounding the first applicator and described by a formula $A=(\frac{1}{2}N+\frac{1}{4})X$, where N is any non-negative integer.

(17) The apparatus of any one of (1) to (16), further comprising plural applicators including the first applicator and the second applicator, wherein total power delivered by the plural applicators is P and volume of the load is V and a ratio of P to V is in a range defined by 0.05 kW/L to 2.5 kW/L.

(18) The apparatus of any one of (1) to (17), further comprising plural applicators including the first applicator and the second applicator, wherein at least two of the plural applicators emit microwave energy at different frequencies from each other, and the penetration depth of the microwave energy is a longest penetration depth among all applicators emitting microwave energy at the load.

(19) A method for processing a material through application of microwave energy, the method comprising: supplying a load comprising the material to a vessel disposed inside a chamber; and applying microwave energy to the load in the vessel through a first applicator and a second applicator configured to emit the microwave energy at the load, wherein points at which microwave energy emitted by the first applicator and the second applicator enter the load are spaced at a distance from each other that is longer than a penetration depth of the microwave energy into the load such that no electromagnetic intercoupling occurs between the first applicator and the second applicator upon emission of the microwave energy.

(20) A material processed by the method of (19).

(21) The method of (19), further comprising at least one step of dissolving, heating, synthesizing, or otherwise transforming the material, such that the material after performance of the method has physical or chemical characteristics different from physical or chemical characteristics of the material prior to performance of the method.

(22) The method of either (19) or (21), further comprising applying at least one of an exothermic reaction, an induction heater, an electrical resistance heater, a heated fluid, a beam of charged particles, a stream of magnetic particles, a plasma heater, a laser heater, an ultrasound, or other energy source that causes a change of the physical or chemical characteristics of the material.

The invention claimed is:

1. An apparatus for large batch chemical reactions using microwave energy, comprising:

a chamber defined by an outer wall;

a vessel disposed inside the chamber, the vessel defined by an inner wall, the inner wall being separated from the outer wall by a pressurized gap, the vessel configured to receive and hold a load;

a first applicator and a second applicator disposed in the pressurized gap and completely spanning between the outer wall of the chamber and the inner wall of the vessel, the first applicator and the second applicator configured to emit the microwave energy at the load, wherein points at which microwave energy emitted by the first applicator and the second applicator enter the load are spaced at a distance from each other that is longer than a penetration depth of the microwave energy into the load such that no electromagnetic intercoupling occurs between the first applicator and the second applicator upon emission of the microwave energy;

separate first and second microwave shielding areas located in the pressurized gap and configured to reflect microwave energy, the first microwave shielding area enclosing the first applicator located in the pressurized gap and the second microwave shielding area enclosing the second applicator located in the pressurized gap, such that the first applicator in the pressurized gap is shielded from the second applicator in the pressurized gap and the second applicator in the pressurized gap is shielded from the first applicator in the pressurized gap; and a plurality of boundaries that bound the separate first and second microwave shielding areas within the gap, each of the plurality of boundaries further comprising at least one of a metallic diffraction grating and a metallic slab having holes, the gap further comprising a non-microwave-absorbing fluid substance configured to penetrate microwave shielding areas within the gap, wherein the non-microwave-absorbing fluid substance is configured to maintain a differential pressure between a vessel pressure inside the vessel and a chamber pressure inside the chamber.

2. The apparatus of claim 1, further comprising:

a first microwave window formed through the inner wall at a position corresponding to a location of the first applicator; and a second microwave window formed through the inner wall at a position corresponding to a location of the second applicator, wherein a material of the first microwave window and the second microwave window is at least partially transparent to microwave energy and chemically resistant to reagents in the load, the first applicator being configured to emit the microwave energy through the first microwave window into the vessel.

3. The apparatus of claim 2, wherein the first applicator includes a waveguide at a first end of the first applicator and a horn antenna at a second end of the first applicator, the second end of the first applicator being disposed proximal to the first microwave window and the first end of the first applicator being disposed distal to the first microwave window, the waveguide configured to receive the microwave energy and direct the microwave energy through the waveguide into the horn antenna.

4. The apparatus of claim 2, wherein when the first applicator and the second applicator are disposed inside the vessel, a distance between locations of the first applicator and the second applicator within the vessel is longer than a longest penetration depth of the microwave energy into the load among all steps of a chemical process cycle that include emitting the microwave energy at the load by the first applicator and the second applicator, and when the first applicator and the second applicator are dispose outside the vessel, a distance between the first microwave window and the second microwave window is longer than a longest penetration depth of the microwave energy into the load among all the steps of the chemical process cycle that include emitting the microwave energy at the load by the first applicator and the second applicator.

5. The apparatus of claim 2, wherein when the first applicator and the second applicator are disposed inside the vessel, a distance between locations of the first applicator and the second applicator within the vessel is 1.5 times longer than a longest penetration depth of the microwave energy into the load among all steps of a chemical process cycle that include emitting the microwave energy at the load by the first applicator and the second applicator, and when the first applicator and the second applicator are disposed outside the vessel, a distance between the first microwave window and the second microwave window is 1.5 times longer than a longest penetration depth of the microwave energy into the load among all the steps of the chemical process cycle that include emitting the microwave energy at the load by the first applicator and the second applicator.

6. The apparatus of claim 2, wherein when the first applicator and the second applicator are disposed inside the vessel, a distance between locations of the first applicator and the second applicator within the vessel is 2 times longer than a longest penetration depth of the microwave energy into the load among all steps of a chemical process cycle that include emitting the microwave energy at the load by the first applicator and the second applicator, and when the first applicator and the second applicator are disposed outside the vessel, a distance between the first microwave window and the second microwave window is 2 times longer than a longest penetration depth of the microwave energy into the load among all the steps of the chemical process cycle that include emitting the microwave energy at the load by the first applicator and the second applicator.

7. The apparatus of claim 1, wherein the first applicator and the second applicator each occupy a corresponding subspace in the pressurized gap between the outer wall of the chamber and the inner wall of the vessel.

8. The apparatus of claim 1, further comprising a first microwave generator configured to generate the microwave energy having a first frequency at a first power and transmit the microwave energy to the first applicator, the first microwave generator being electromagnetically connected to the first applicator.

9. The apparatus of claim 8, further comprising:

a first microwave window formed in the inner wall at a position corresponding to a location of the first applicator; and a second microwave window formed in the inner wall at a position corresponding to a location of the second applicator, wherein a material of the first microwave window and the second microwave window chemically resistant to reagents in the load, the first applicator being disposed inside the vessel and configured to receive the microwave energy from the first microwave generator through the first microwave window.

10. The apparatus of claim 8, wherein the first microwave generator is located outside the chamber and connected to the first applicator, which is located in the pressurized gap.

11. The apparatus of claim 1, wherein the vessel is pressurized and the chamber is pressurized.

12. The apparatus of claim 1, further comprising a mixing device, the mixing device configured to homogenize reagents in the load.

13. The apparatus of claim 1, wherein the load comprises a liquid-based reactive medium capable of absorbing microwave energy, and the penetration depth of the microwave energy is a longest penetration depth of the microwave energy into the reactive medium among all steps of a chemical process cycle that include emitting the microwave energy at the reactive medium.

14. The apparatus of claim 13, wherein a volume of the liquid-based reactive medium in the vessel is equal to or more than 100 L.

15. The apparatus of claim 1, wherein a distance between the first applicator in the pressurized gap and a wall of the first microwave shielding area is fixed and equal to length A that is based on a wavelength X of microwave radiation in a space surrounding the first applicator and described by a formula $$A = (1/2N + 1/4)X$$

wherein N is any non-negative integer.

16. The apparatus of claim 1, further comprising plural applicators including the first applicator and the second applicator, wherein total power delivered by the plural applicators is P and volume of the load is V and a ratio of P to V is in a range defined by 0.05 KW/L to 2.5 KW/L.

17. The apparatus of claim 1, further comprising plural applicators including the first applicator and the second applicator, wherein at least two of the plural applicators emit microwave energy at different frequencies from each other, and the penetration depth of the microwave energy is a longest penetration depth among all applicators emitting microwave energy at the load.

* * * * *